United States Patent
Kuzuhara et al.

(10) Patent No.: US 8,885,265 B2
(45) Date of Patent: Nov. 11, 2014

(54) ZOOM LENS SYSTEM, IMAGING DEVICE AND CAMERA

(75) Inventors: Satoshi Kuzuhara, Osaka (JP); Katsu Yamada, Osaka (JP); Shinji Yamaguchi, Osaka (JP); Tsutomu Iwashita, Osaka (JP)

(73) Assignee: Panasonic Corporation, Kadoma-shi (JP)

( * ) Notice: Subject to any disclaimer, the term of this patent is extended or adjusted under 35 U.S.C. 154(b) by 160 days.

(21) Appl. No.: 13/337,325

(22) Filed: Dec. 27, 2011

(65) Prior Publication Data

US 2012/0162497 A1 Jun. 28, 2012

(30) Foreign Application Priority Data

Dec. 28, 2010 (JP) ................................. 2010-291938
Oct. 25, 2011 (JP) ................................. 2011-234239

(51) Int. Cl.
*G02B 15/14* (2006.01)
*G02B 27/64* (2006.01)
*G02B 15/177* (2006.01)

(52) U.S. Cl.
CPC .............. *G02B 15/177* (2013.01); *G02B 15/14* (2013.01); *G02B 27/646* (2013.01)
USPC .............................. 359/689; 359/557; 359/676

(58) Field of Classification Search
CPC ............ G02B 9/00; G02B 9/12; G02B 15/14; G02B 15/177; G02B 26/64; G02B 26/646
USPC ......... 359/680, 698, 689, 554–557, 676–677, 359/682, 686
See application file for complete search history.

(56) References Cited

U.S. PATENT DOCUMENTS

| | | | | |
|---|---|---|---|---|
| 6,611,386 | B2* | 8/2003 | Tanaka .......................... | 359/689 |
| 7,133,215 | B2* | 11/2006 | Otake ........................... | 359/689 |
| 7,365,912 | B2* | 4/2008 | Lee ............................... | 359/680 |
| 7,460,311 | B2* | 12/2008 | Sekita ........................... | 359/682 |
| 7,612,949 | B2* | 11/2009 | Ohtake et al. ................. | 359/689 |
| 7,800,834 | B2* | 9/2010 | Ori ................................ | 359/689 |
| 7,830,616 | B2* | 11/2010 | Masugi ......................... | 359/689 |
| 7,957,070 | B2* | 6/2011 | Yamano et al. ............... | 359/682 |
| 2005/0200970 | A1* | 9/2005 | Nose et al. .................... | 359/680 |
| 2008/0158690 | A1* | 7/2008 | Eguchi .......................... | 359/689 |

FOREIGN PATENT DOCUMENTS

| | | | |
|---|---|---|---|
| JP | 2005-128194 | A | 5/2005 |
| JP | 2005-258067 | A | 9/2005 |
| JP | 2006-011096 | A | 1/2006 |
| JP | 2007-155836 | A | 6/2007 |

(Continued)

*Primary Examiner* — Thong Nguyen
(74) *Attorney, Agent, or Firm* — James W. Judge

(57) ABSTRACT

A zoom lens system comprising: a negative first lens unit; a positive second lens unit; and a positive third lens unit, wherein the first to third lens units are individually moved along an optical axis to vary magnification in zooming, the first lens unit is composed of two lens elements and includes a positive lens element having at least one aspheric surface, the third lens unit is composed of one lens element, and the condition: $1.74 < \mathrm{Ir}/\sqrt{(|D_{L1} \times f_{G1}|)}$ ($D_{L1}$: an optical axial thickness of an object side first lens element in the first lens unit, $f_{G1}$: a focal length of the first lens unit, $\mathrm{Ir} = f_T \times \tan(\omega_T)$, $f_T$ and $\omega_T$: a focal length of the entire system and a half value of maximum view angle at a telephoto limit) is satisfied; an imaging device; and a camera are provided.

15 Claims, 28 Drawing Sheets

(56) References Cited

FOREIGN PATENT DOCUMENTS

| JP | 2008-058600 A | 3/2008 |
|----|---------------|--------|
| JP | 2008-209727 A | 9/2008 |
| JP | 2008-233161 A | 10/2008 |
| JP | 2008-233164 A | 10/2008 |
| JP | 2008-257179 A | 10/2008 |
| JP | 2009-092740 A | 4/2009 |
| JP | 2009-251568 A | 10/2009 |

* cited by examiner

ZOOM LENS SYSTEM, IMAGING DEVICE AND CAMERA

CROSS-REFERENCE TO RELATED APPLICATION

This application is based on application No. 2010-291938 filed in Japan on Dec. 28, 2010 and application No. 2011-234239 filed in Japan on Oct. 25, 2011, the contents of which are hereby incorporated by reference.

BACKGROUND OF THE INVENTION

1. Field of the Invention

The present invention relates to zoom lens systems, imaging devices, and cameras. In particular, the present invention relates to: compact zoom lens systems each having a wide view angle at a wide-angle limit and a high zooming ratio, being capable of rapid focusing, and realizing high optical performance particularly in a close-object in-focus condition; imaging devices employing the zoom lens systems; and thin and compact cameras employing the imaging devices.

2. Description of the Background Art

Conventionally, there has been great demand for size reduction and high performance of cameras each including an image sensor that performs light-to-electricity conversion, such as digital still cameras and digital video cameras (referred to simply as "digital cameras", hereinafter).

As zoom lens systems to be used in the above-mentioned compact digital cameras, various zoom lenses each having a three-unit construction of negative, positive, and positive have been proposed, in which a first lens unit having negative optical power, a second lens unit having positive optical power, and a third lens unit having positive optical power are arranged in order from an object side to an image side.

Japanese Laid-Open Patent Publication No. 2005-258067 discloses a zoom lens having the above-mentioned three-unit construction of negative, positive, and positive, in which each air space between the first to third lens units is varied to vary magnification, the interval between the first and second lens units is varied in zooming from a wide-angle limit to a telephoto limit to vary magnification, the first lens unit is composed of two lenses, the second lens unit is composed of three lenses, i.e., a positive lens, a negative lens, and a positive lens in order from the object side, and the third lens unit is composed of one lens.

Japanese Laid-Open Patent Publications Nos. 2009-251568 and 2009-092740 each disclose a zoom lens having the above-mentioned three-unit construction of negative, positive, and positive, in which each air space between the first to third lens units is varied to vary magnification, the interval between the first and second lens units is varied in zooming from a wide-angle limit to a telephoto limit to vary magnification, the first lens unit is composed of two lenses, the second lens unit is composed of one positive lens and two negative lenses, and the third lens unit is composed of one lens.

Japanese Laid-Open Patent Publication No. 2005-128194 discloses a zoom lens having the above-mentioned three-unit construction of negative, positive, and positive, in which each air space between the first to third lens units is varied to vary magnification, the first lens unit is composed of two lenses, the second lens unit is composed of three lenses, i.e., a positive lens, a positive lens, and a negative lens in order from the object side, and the third lens unit is composed of one lens.

Each of the zoom lenses disclosed in Japanese Laid-Open Patent Publications Nos. 2005-258067, 2009-251568, and 2005-128194 has a short overall length of lens system, and therefore, realizes a further reduction in the thickness of a compact type digital camera. However, each of the zoom lenses has a variable magnification ratio as small as approximately 3, and a view angle as small as approximately 66° at a wide-angle limit, and therefore, does not satisfy the requirements for digital cameras in recent years.

On the other hand, the zoom lens disclosed in Japanese Laid-Open Patent Publication No. 2009-092740 has a variable magnification ratio as great as approximately 4. However, the zoom lens has a long overall length of lens system, and a view angle as small as approximately 60° at a wide-angle limit, and therefore, does not satisfy the requirements for digital cameras in recent years.

SUMMARY OF THE INVENTION

An object of the present invention is to provide: a compact zoom lens system having not only a wide view angle at a wide-angle limit but also high optical performance; an imaging device employing the zoom lens system; and a thin and compact camera employing the imaging device.

The novel concepts disclosed herein were achieved in order to solve the foregoing problems in the conventional art, and herein is disclosed:

a zoom lens system having a plurality of lens units, each lens unit being composed of at least one lens element, the zoom lens system, in order from an object side to an image side, comprising:

a first lens unit having negative optical power;
a second lens unit having positive optical power; and
a third lens unit having positive optical power, wherein
in zooming from a wide-angle limit to a telephoto limit at the time of image taking, the first lens unit, the second lens unit, and the third lens unit are individually moved along an optical axis to vary magnification,
the first lens unit is composed of two lens elements,
the third lens unit is composed of one lens element,
the first lens unit includes a lens element having at least one aspheric surface and positive optical power, and
the following condition (1) is satisfied:

$$1.74 < Ir/\sqrt{(|D_{L1} \times f_{G1}|)} \quad (1)$$

where
$D_{L1}$ is an optical axial thickness of a first lens element located on the object side in the first lens unit,
$f_{G1}$ is a focal length of the first lens unit,
Ir is a maximum image height ($Ir = f_T \times \tan(\omega_T)$),
$f_T$ is a focal length of the entire system at a telephoto limit, and
$\omega_T$ is a half value (°) of maximum view angle at a telephoto limit.

The novel concepts disclosed herein were achieved in order to solve the foregoing problems in the conventional art, and herein is disclosed:

an imaging device capable of outputting an optical image of an object as an electric image signal, comprising:

a zoom lens system that forms an optical image of the object; and
an image sensor that converts the optical image formed by the zoom lens system into the electric image signal, wherein
the zoom lens system has a plurality of lens units, each lens unit being composed of at least one lens element, the zoom lens system, in order from an object side to an image side, comprising:

a first lens unit having negative optical power;
a second lens unit having positive optical power; and a third lens unit having positive optical power, wherein
in zooming from a wide-angle limit to a telephoto limit at
the time of image taking, the first lens unit, the second lens
unit, and the third lens unit are individually moved along an
optical axis to vary magnification, the first lens unit is composed of two lens elements, the third lens unit is composed of one lens element, the first lens unit includes a lens element having at least one
aspheric surface and positive optical power, and the following condition (1) is satisfied:

$$1.74 < Ir/\sqrt{(|D_{L1} \times f_{G1}|)} \tag{1}$$

where $D_{L1}$ is an optical axial thickness of a first lens element
located on the object side in the first lens unit, $f_{G1}$ is a focal length of the first lens unit, Ir is a maximum image height ($Ir = f_T \times \tan(\omega_T)$), $f_T$ is a focal length of the entire system at a telephoto limit,
and $\omega_T$ is a half value (°) of maximum view angle at a telephoto
limit.

The novel concepts disclosed herein were achieved in
order to solve the foregoing problems in the conventional art,
and herein is disclosed:

a camera for converting an optical image of an object into
an electric image signal and then performing at least one of
displaying and storing of the converted image signal, comprising:

an imaging device including a zoom lens system that forms
an optical image of the object, and an image sensor that
converts the optical image formed by the zoom lens system
into the electric image signal, wherein the zoom lens system has a plurality of lens units, each lens
unit being composed of at least one lens element, the zoom
lens system, in order from an object side to an image side,
comprising:

a first lens unit having negative optical power;

a second lens unit having positive optical power; and a third lens unit having positive optical power, wherein in zooming from a wide-angle limit to a telephoto limit at
the time of image taking, the first lens unit, the second lens
unit, and the third lens unit are individually moved along an
optical axis to vary magnification, the first lens unit is composed of two lens elements, the third lens unit is composed of one lens element, the first lens unit includes a lens element having at least one
aspheric surface and positive optical power, and the following condition (1) is satisfied:

$$1.74 < Ir/\sqrt{(|D_{L1} \times f_{G1}|)} \tag{1}$$

where $D_{L1}$ is an optical axial thickness of a first lens element
located on the object side in the first lens unit, $f_{G1}$ is a focal length of the first lens unit, Ir is a maximum image height ($Ir = f_T \times \tan(\omega_T)$), $f_T$ is a focal length of the entire system at a telephoto limit,
and $\omega_T$ is a half value (°) of maximum view angle at a telephoto
limit.

According to the present invention, it is possible to provide: a compact zoom lens system having not only a wide view angle at a wide-angle limit but also high optical performance; an imaging device employing the zoom lens system; and a thin and compact camera employing the imaging device.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Embodiments 1 to 9

FIGS. 1, 4, 7, 10, 13, 16, 19, 22, and 25 are lens arrangement diagrams of zoom lens systems according to Embodiments 1 to 9, respectively.

Each of FIGS. 1, 4, 7, 10, 13, 16, 19, 22, and 25 shows a zoom lens system in an infinity in-focus condition. In each Fig., part (a) shows a lens configuration at a wide-angle limit (in the minimum focal length condition: focal length $f_W$), part (b) shows a lens configuration at a middle position (in an intermediate focal length condition: focal length $f_M = \sqrt{(f_W * f_T)}$), and part (c) shows a lens configuration at a telephoto limit (in the maximum focal length condition: focal length $f_T$). Further, in each Fig., an arrow of straight or curved line provided between part (a) and part (b) indicates the movement of each lens unit from a wide-angle limit through a middle position to a telephoto limit. Moreover, in each Fig., an arrow imparted to a lens unit indicates focusing from an infinity in-focus condition to a close-object in-focus condition. That is, the arrow indicates the moving direction at the time of focusing from an infinity in-focus condition to a close-object in-focus condition.

Each of the zoom lens systems according to the respective embodiments, in order from the object side to the image side, comprises: a first lens unit G1 having negative optical power; a second lens unit G2 having positive optical power; and a third lens unit G3 having positive optical power. In zooming, the first lens unit G1, the second lens unit G2, and the third lens unit G3 individually move in a direction along the optical axis such that the intervals between the respective lens units, i.e., the interval between the first lens unit G1 and the second lens unit G2 and the interval between the second lens unit G2 and the third lens unit G3, vary. In the zoom lens systems according to the respective embodiments, these lens units are arranged in a desired optical power configuration, and thereby size reduction of the entire lens system is achieved while maintaining high optical performance.

Further, in FIGS. 1, 4, 7, 10, 13, 16, 19, 22, and 25, an asterisk "*" imparted to a particular surface indicates that the surface is aspheric. In each Fig., symbol (+) or (−) imparted to the symbol of each lens unit corresponds to the sign of the optical power of the lens unit. In each Fig., the straight line located on the most right-hand side indicates the position of the image surface S. On the object side relative to the image surface S (that is, between the image surface S and the most image side lens surface of the third lens unit G3), a plane parallel plate P equivalent to such as a face plate of an image sensor is provided.

Further, as shown in FIGS. 1, 4, 7, 10, 13, 16, 19, 22, and 25, an aperture diaphragm A is provided between the first lens unit G1 and the second lens unit G2.

Figure 1:
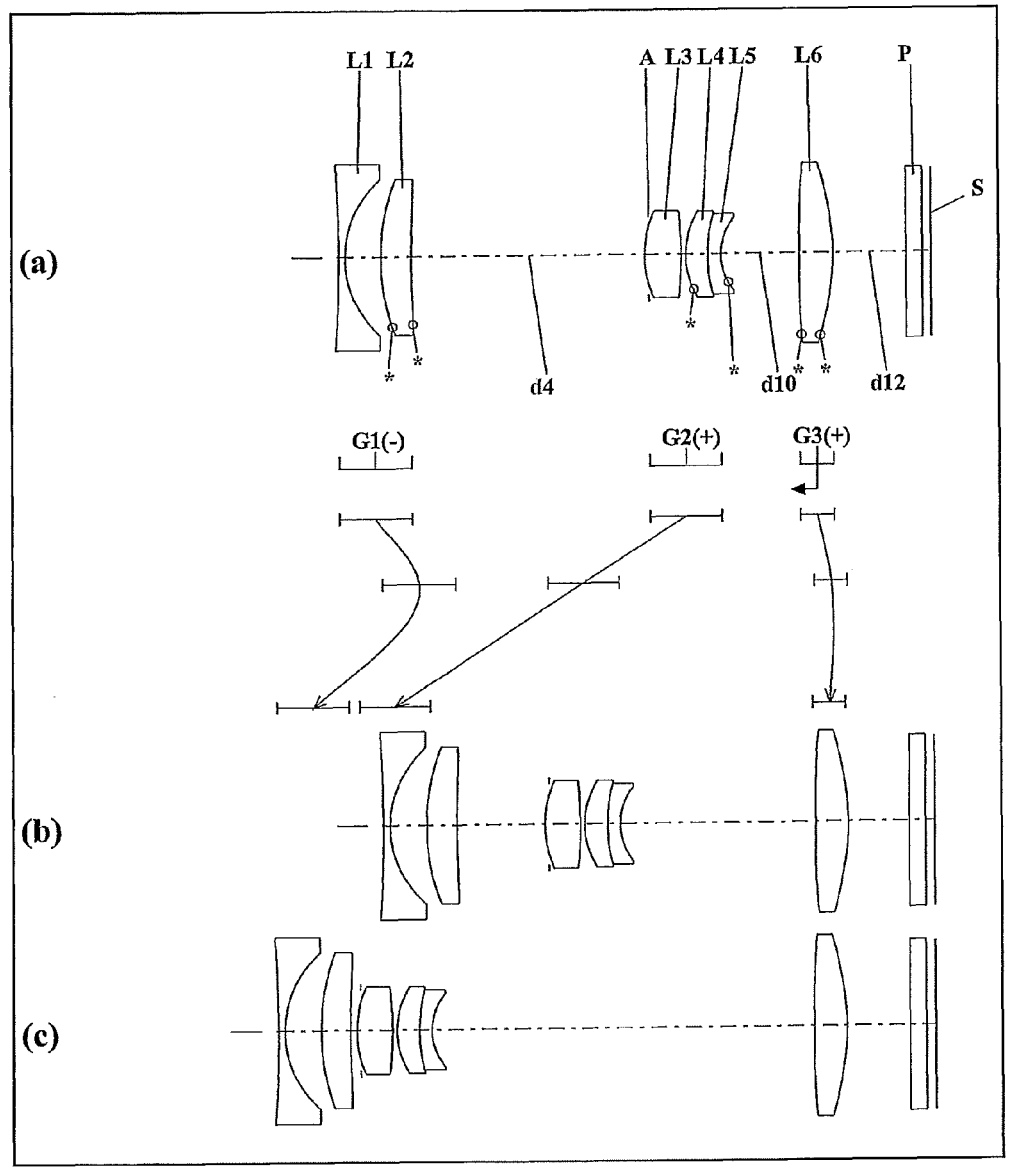
FIG. 1 is a lens arrangement diagram showing an infinity in-focus condition of a zoom lens system according to Embodiment 1 (Example 1)
Figure 2:
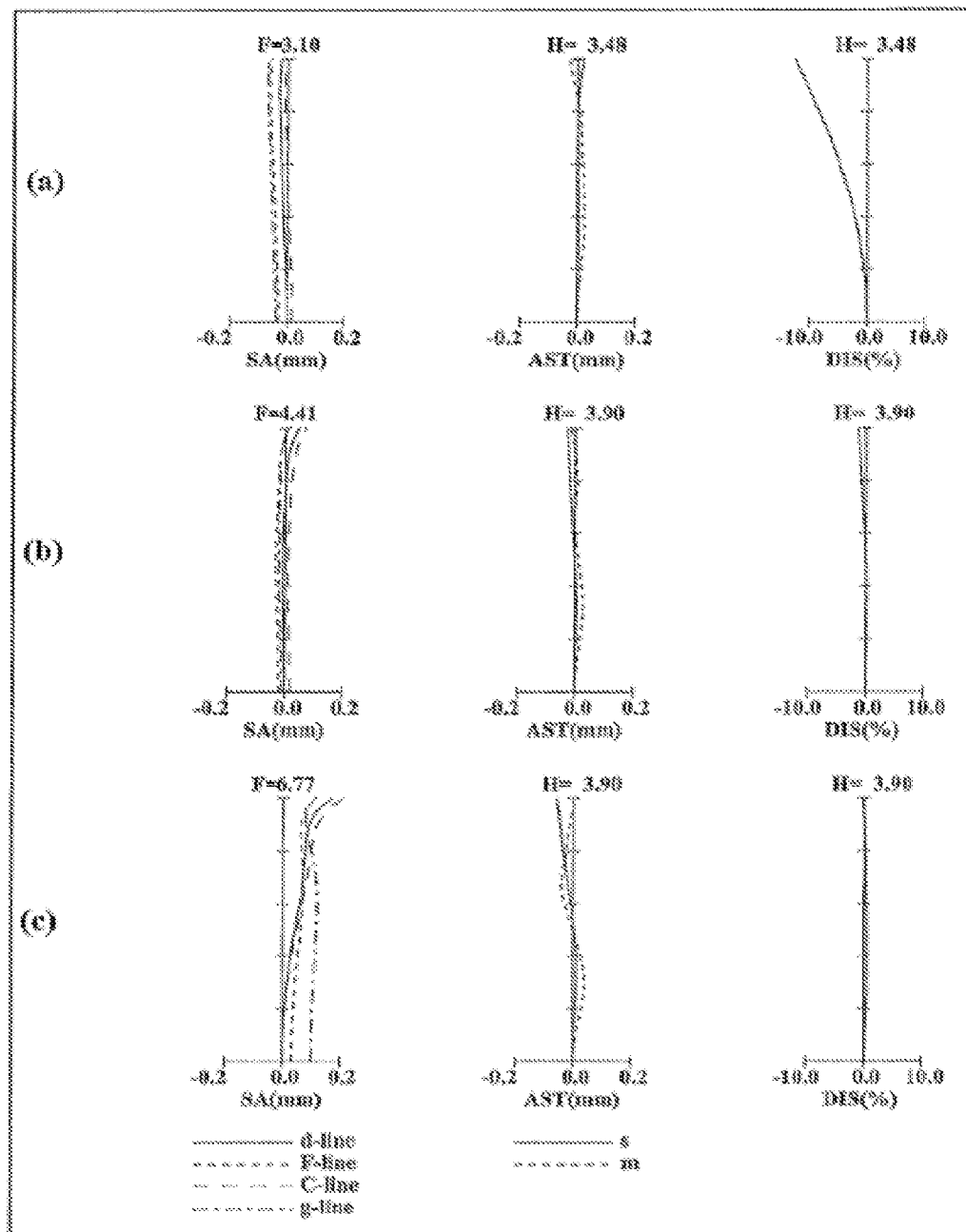
FIG. 2 is a longitudinal aberration diagram of an infinity in-focus condition of a zoom lens system according to Example 1.
Figure 3:
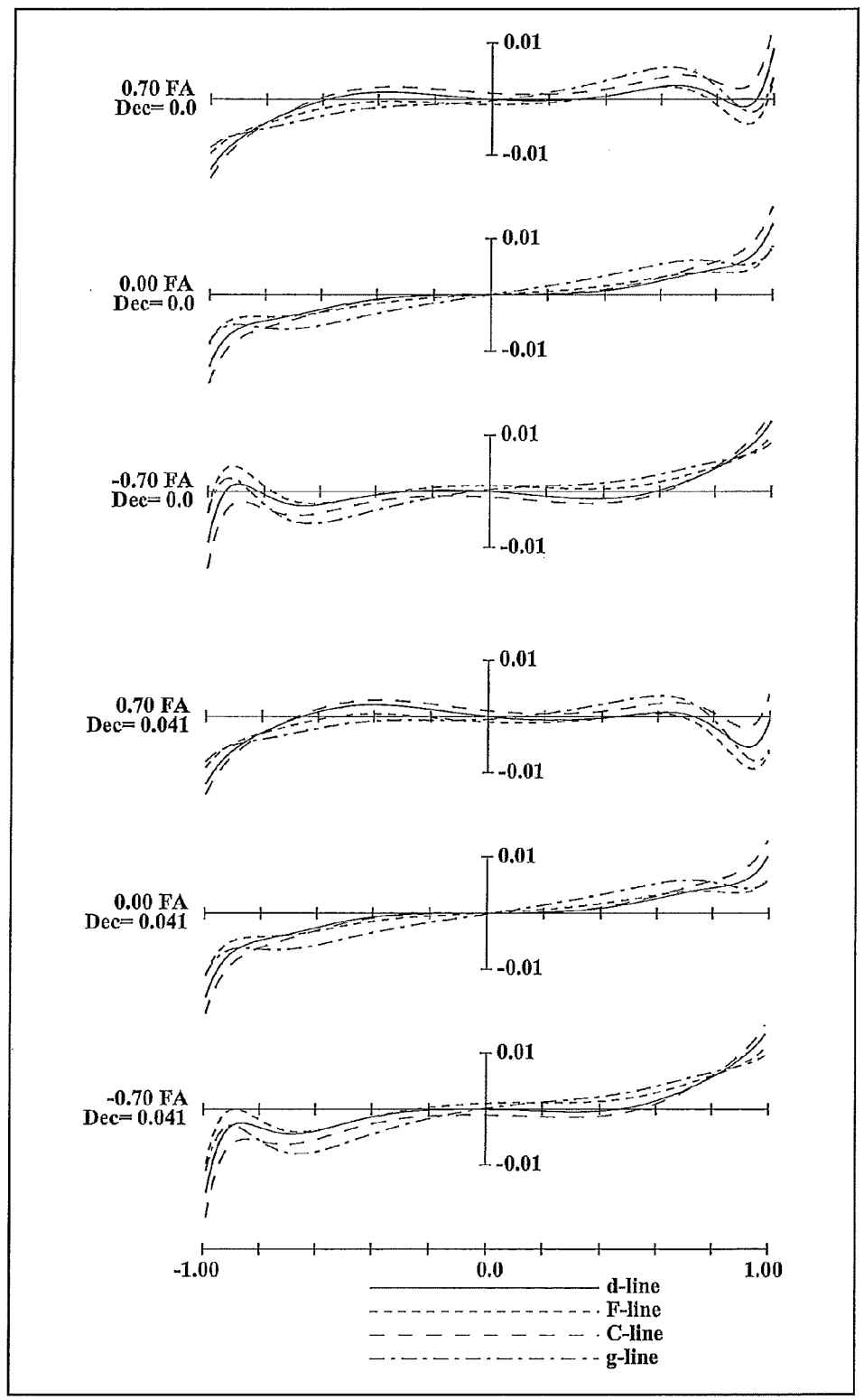
FIG. 3 is a lateral aberration diagram of a zoom lens system according to Example 1 at a telephoto limit in a basic state where image blur compensation is not performed and in a blur compensation state.

As shown in FIG. 1, in the zoom lens system according to Embodiment 1, the first lens unit G1, in order from the object side to the image side, comprises: a bi-concave first lens element L1; and a positive meniscus second lens element L2 with the convex surface facing the object side. Among these, the second lens element L2 has two aspheric surfaces.

In the zoom lens system according to Embodiment 1, the second lens unit G2, in order from the object side to the image side, comprises: a bi-convex third lens element L3; a positive meniscus fourth lens element L4 with the convex surface facing the object side; and a negative meniscus fifth lens element L5 with the convex surface facing the object side. Among these, the fourth lens element L4 and the fifth lens element L5 are cemented with each other. The fourth lens element L4 has an aspheric object side surface. The fifth lens element L5 has an aspheric image side surface.

In the zoom lens system according to Embodiment 1, the third lens unit G3 comprises solely a bi-convex sixth lens element L6. The sixth lens element L6 has two aspheric surfaces.

In the zoom lens system according to Embodiment 1, an aperture diaphragm A is provided on the object side relative to the second lens unit G2 (between the second lens element L2 and the third lens element L3), and a plane parallel plate P is provided on the object side relative to the image surface S (between the image surface S and the sixth lens element L6).

In the zoom lens system according to Embodiment 1, in zooming from a wide-angle limit to a telephoto limit at the time of image taking, the first lens unit G1 moves to the object side with locus of a convex to the image side, the second lens unit G2 monotonically moves to the object side, and the third lens unit G3 moves to the image side with locus of a convex to the image side. That is, in zooming, the respective lens units individually move along the optical axis such that the interval between the first lens unit G1 and the second lens unit G2 should decrease, and the interval between the second lens unit G2 and the third lens unit G3 should increase. Further, in zooming from a wide-angle limit to a telephoto limit at the time of image taking, the aperture diaphragm A moves along the optical axis together with the second lens unit G2.

Further, in the zoom lens system according to Embodiment 1, in focusing from an infinity in-focus condition to a close-object in-focus condition, the third lens unit G3 moves to the object side along the optical axis.

Figure 4:
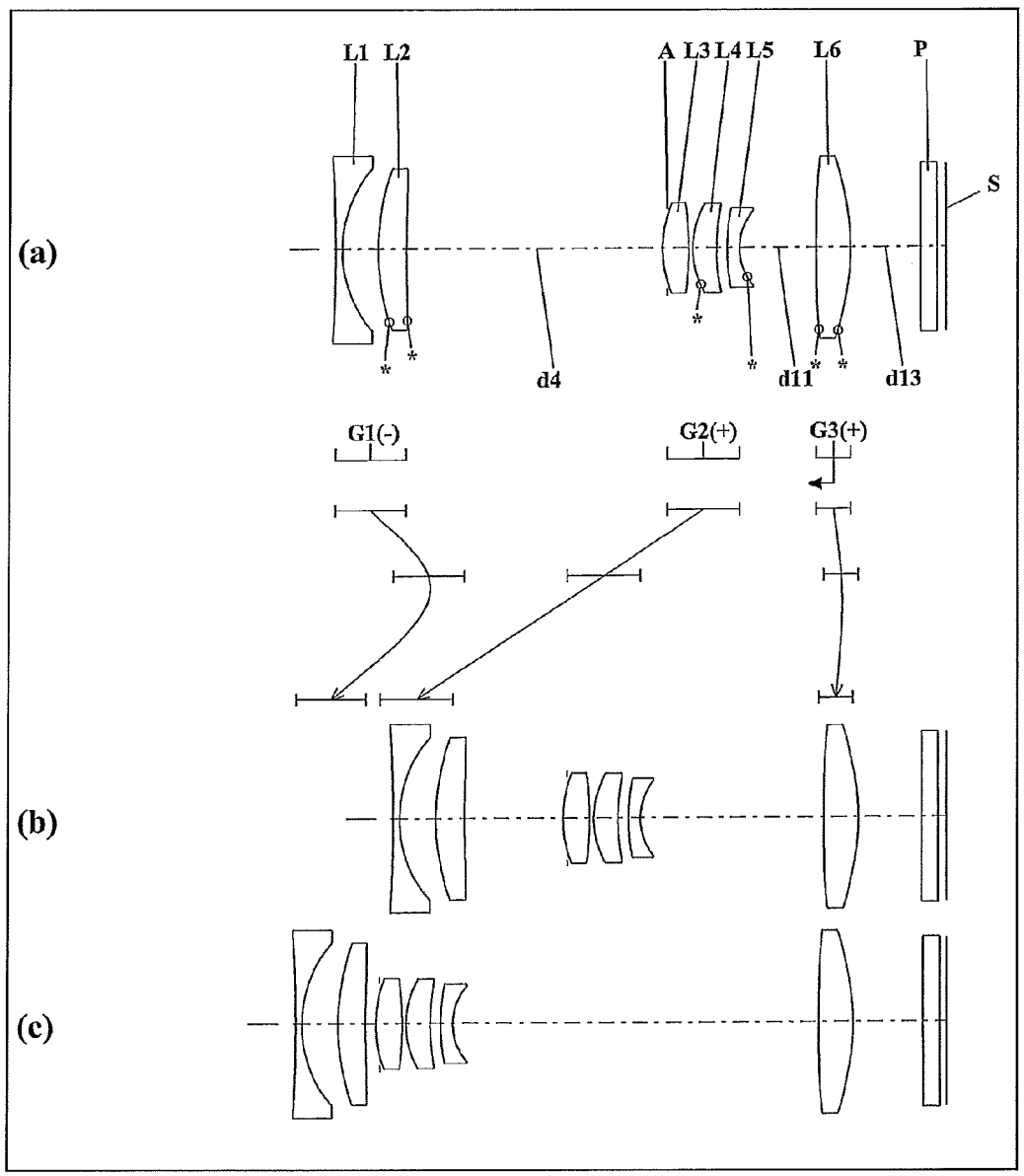
FIG. 4 is a lens arrangement diagram showing an infinity in-focus condition of a zoom lens system according to Embodiment 2 (Example 2)
Figure 5:
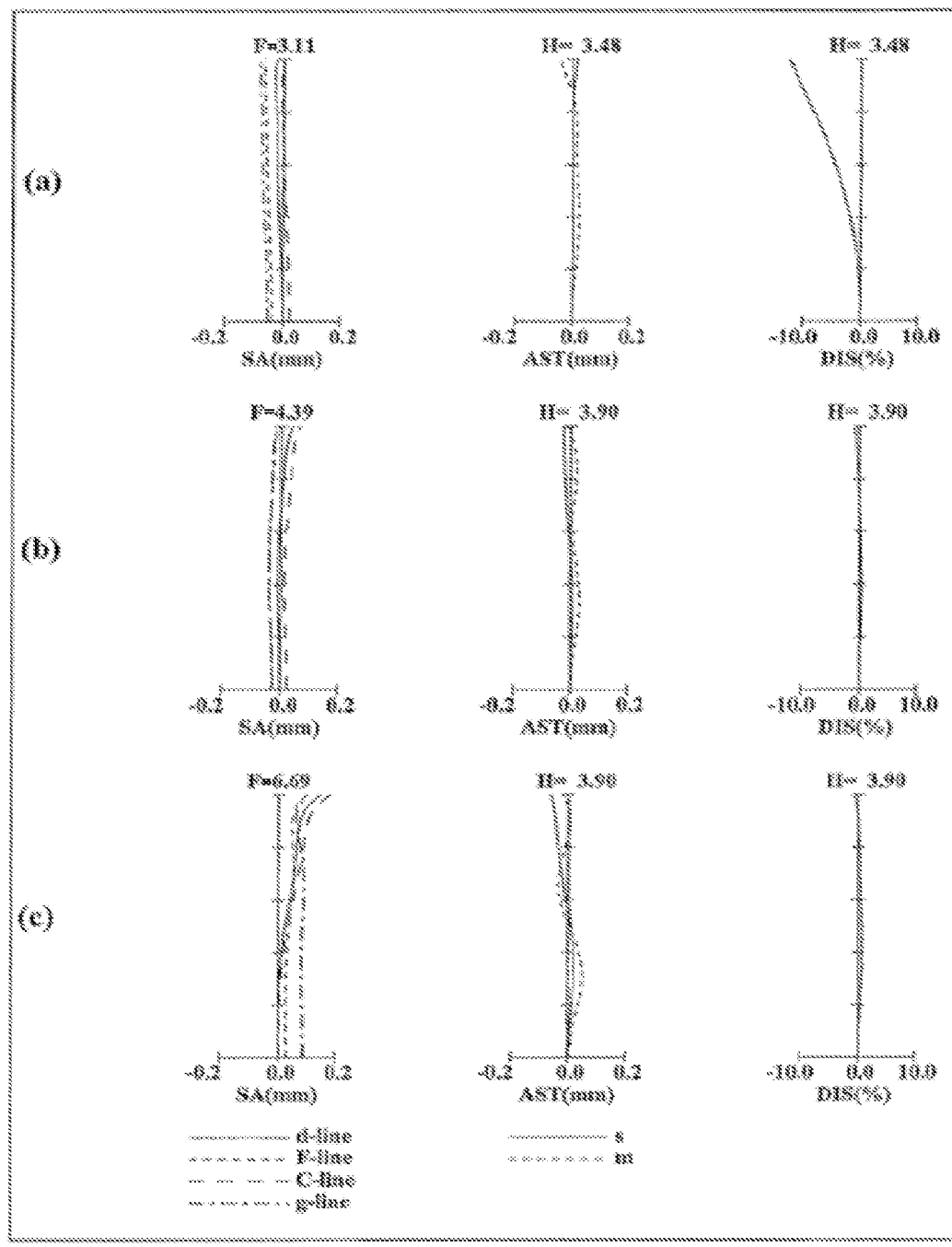
FIG. 5 is a longitudinal aberration diagram of an infinity in-focus condition of a zoom lens system according to Example 2.
Figure 6:
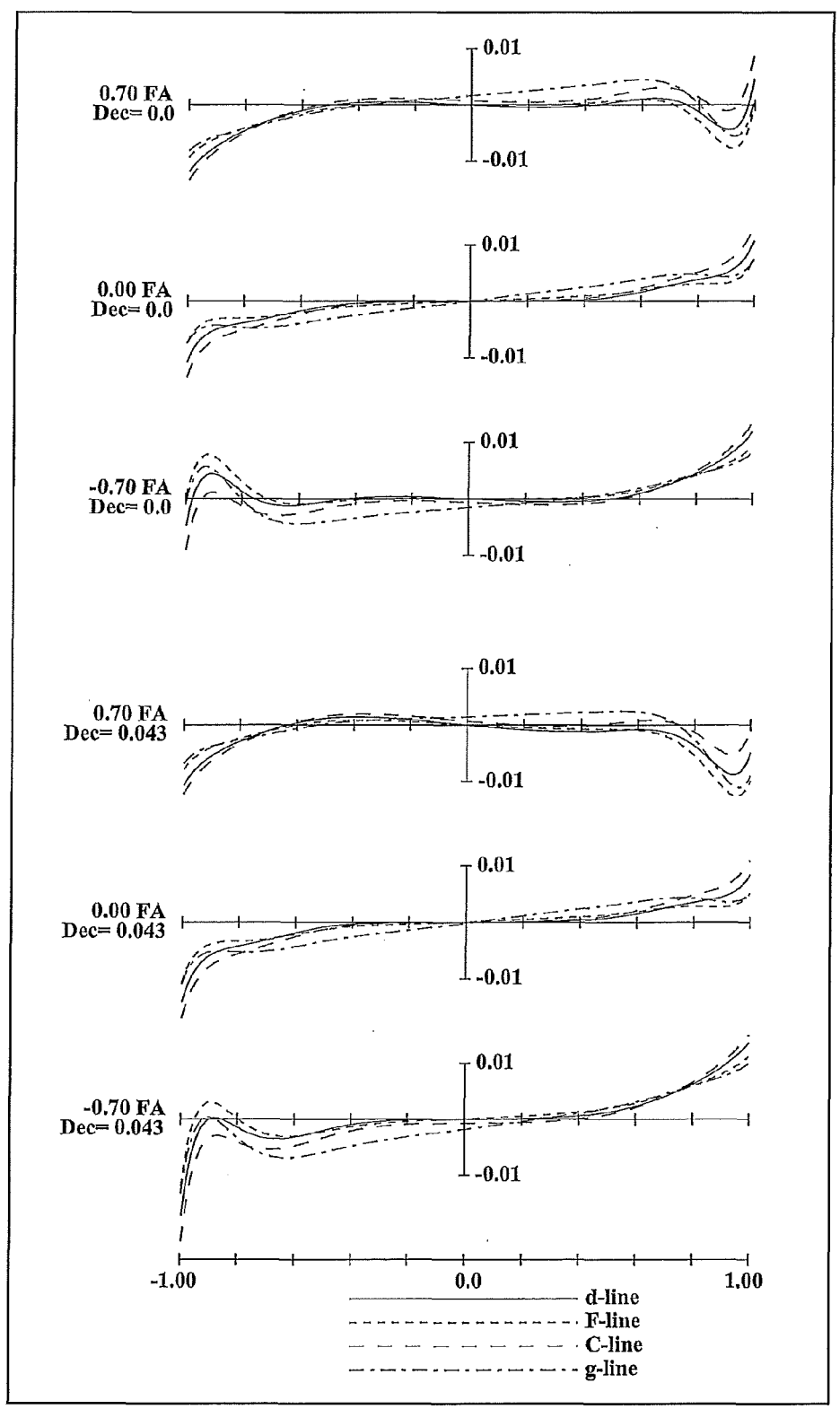
FIG. 6 is a lateral aberration diagram of a zoom lens system according to Example 2 at a telephoto limit in a basic state where image blur compensation is not performed and in a blur compensation state.

As shown in FIG. 4, in the zoom lens system according to Embodiment 2, the first lens unit G1, in order from the object side to the image side, comprises: a bi-concave first lens element L1; and a positive meniscus second lens element L2 with the convex surface facing the object side. Among these, the second lens element L2 has two aspheric surfaces.

In the zoom lens system according to Embodiment 2, the second lens unit G2, in order from the object side to the image side, comprises: a bi-convex third lens element L3; a positive meniscus fourth lens element L4 with the convex surface facing the object side; and a negative meniscus fifth lens element L5 with the convex surface facing the object side. Among these, the fourth lens element L4 has an aspheric object side surface. The fifth lens element L5 has an aspheric image side surface.

In the zoom lens system according to Embodiment 2, the third lens unit G3 comprises solely a bi-convex sixth lens element L6. The sixth lens element L6 has two aspheric surfaces.

In the zoom lens system according to Embodiment 2, an aperture diaphragm A is provided on the object side relative to the second lens unit G2 (between the second lens element L2 and the third lens element L3), and a plane parallel plate P is provided on the object side relative to the image surface S (between the image surface S and the sixth lens element L6).

In the zoom lens system according to Embodiment 2, in zooming from a wide-angle limit to a telephoto limit at the time of image taking, the first lens unit G1 moves to the object side with locus of a convex to the image side, the second lens unit G2 monotonically moves to the object side, and the third lens unit G3 moves to the image side with locus of a convex to the image side. That is, in zooming, the respective lens units individually move along the optical axis such that the interval between the first lens unit G1 and the second lens unit G2 should decrease, and the interval between the second lens unit G2 and the third lens unit G3 should increase. Further, in zooming from a wide-angle limit to a telephoto limit at the time of image taking, the aperture diaphragm A moves along the optical axis together with the second lens unit G2.

Further, in the zoom lens system according to Embodiment 2, in focusing from an infinity in-focus condition to a close-object in-focus condition, the third lens unit G3 moves to the object side along the optical axis.

Figure 7:
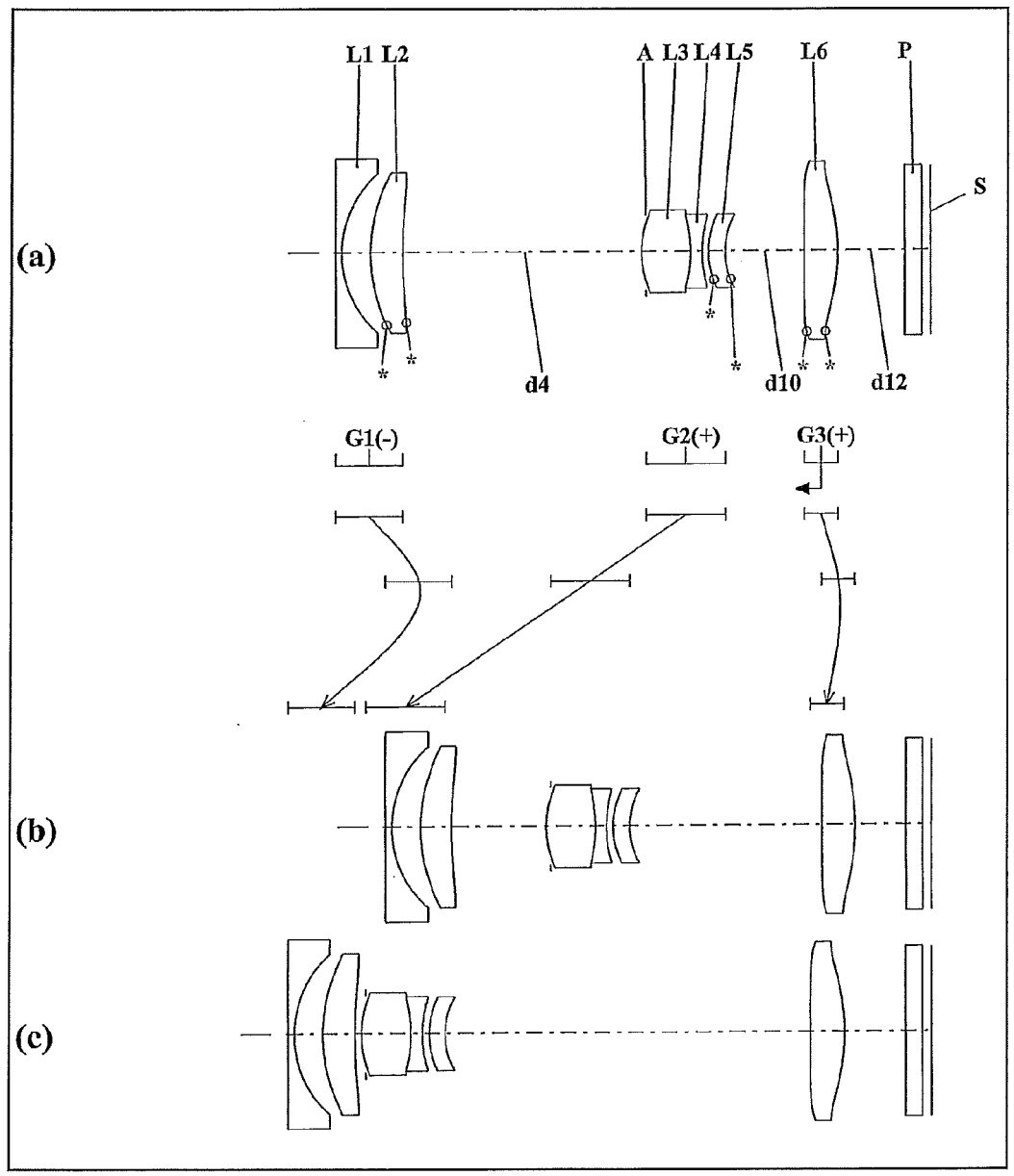
FIG. 7 is a lens arrangement diagram showing an infinity in-focus condition of a zoom lens system according to Embodiment 3 (Example 3)
Figure 8:
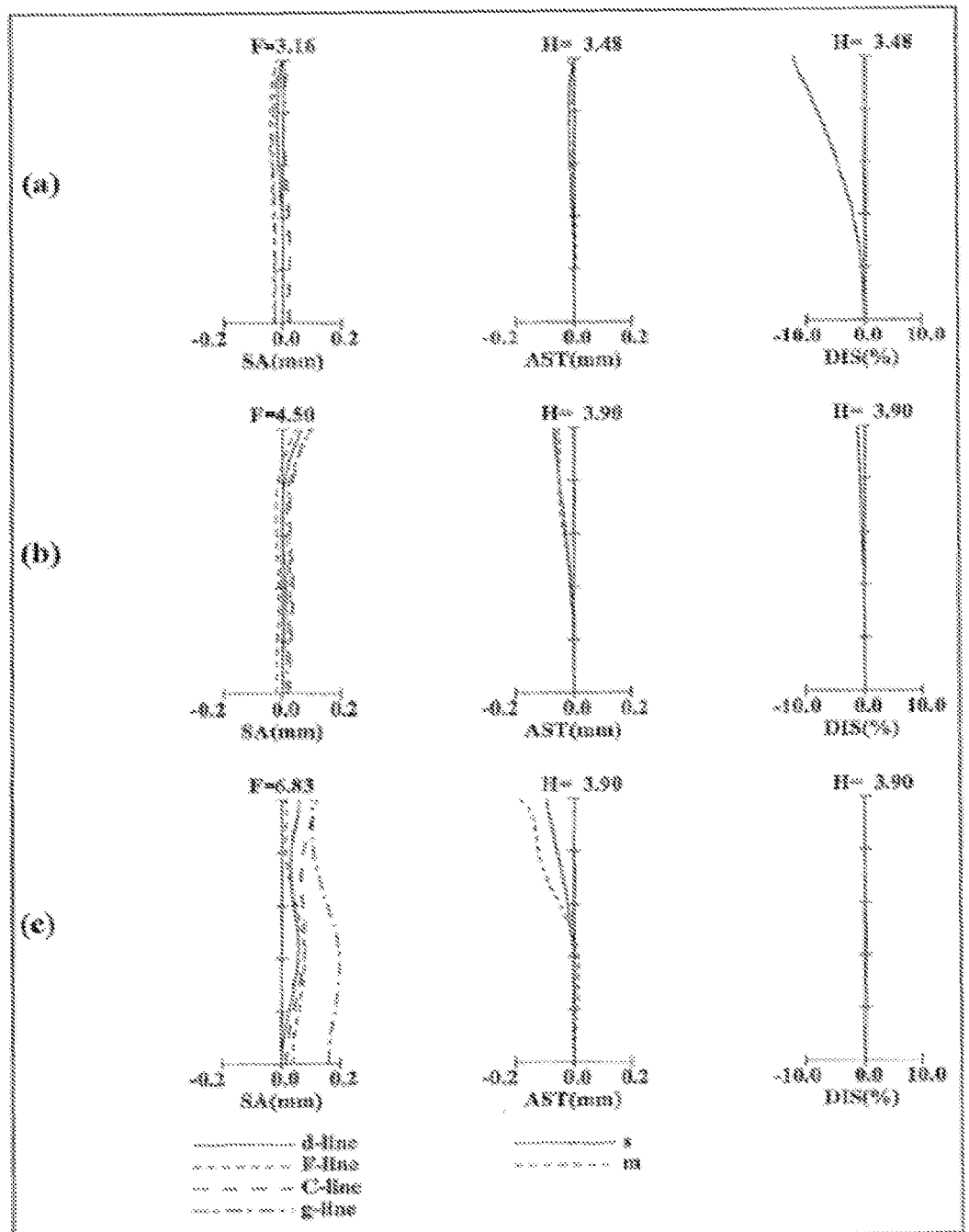
FIG. 8 is a longitudinal aberration diagram of an infinity in-focus condition of a zoom lens system according to Example 3.
Figure 9:
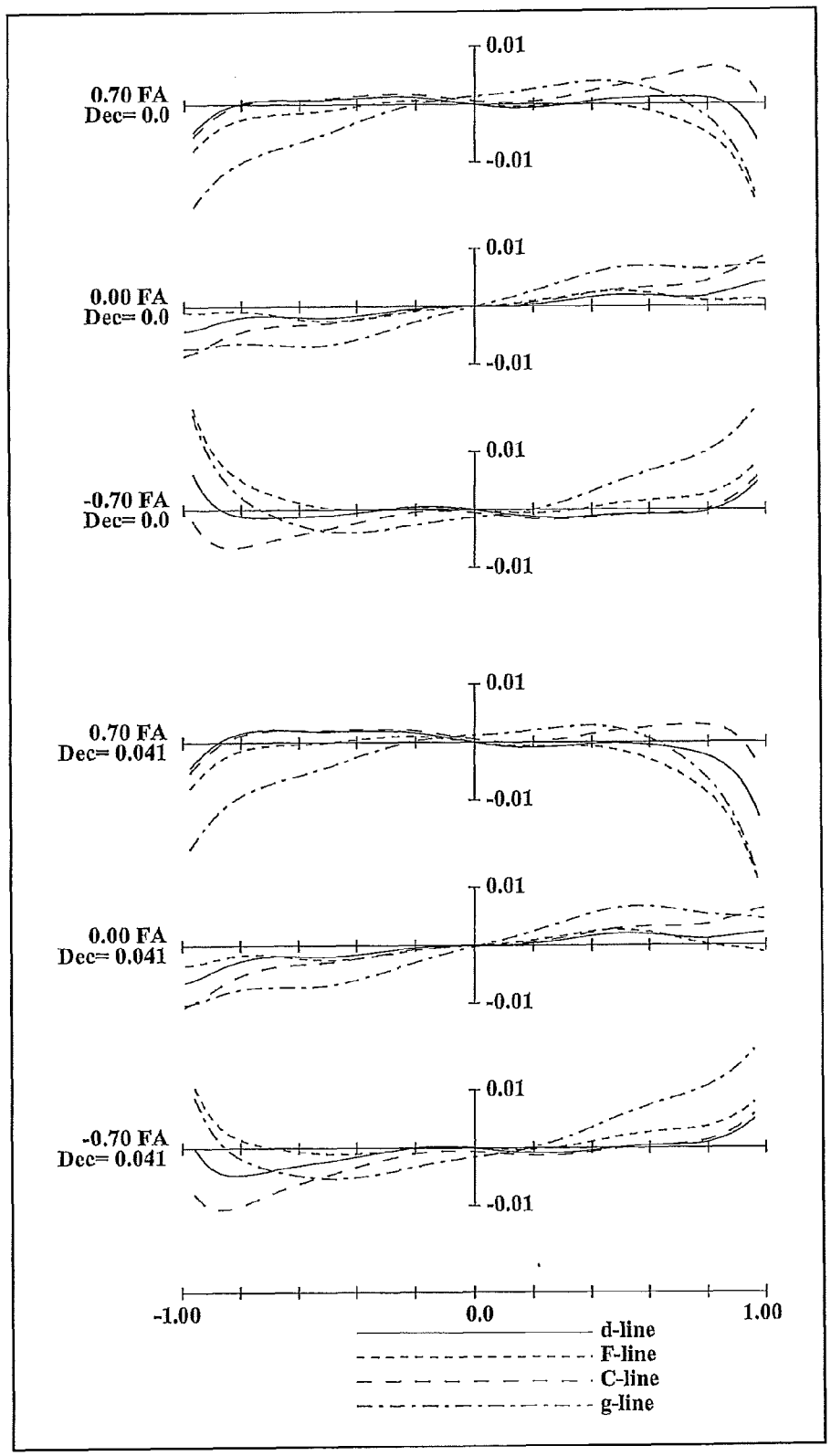
FIG. 9 is a lateral aberration diagram of a zoom lens system according to Example 3 at a telephoto limit in a basic state where image blur compensation is not performed and in a blur compensation state.

As shown in FIG. 7, in the zoom lens system according to Embodiment 3, the first lens unit G1, in order from the object side to the image side, comprises: a negative meniscus first lens element L1 with the convex surface facing the object side; and a positive meniscus second lens element L2 with the convex surface facing the object side. Among these, the second lens element L2 has two aspheric surfaces.

In the zoom lens system according to Embodiment 3, the second lens unit G2, in order from the object side to the image side, comprises: a bi-convex third lens element L3; a bi-concave fourth lens element L4; and a positive meniscus fifth lens element L5 with the convex surface facing the object side. Among these, the third lens element L3 and the fourth lens element L4 are cemented with each other. The fifth lens element L5 has two aspheric surfaces.

In the zoom lens system according to Embodiment 3, the third lens unit G3 comprises solely a bi-convex sixth lens element L6. The sixth lens element L6 has two aspheric surfaces.

In the zoom lens system according to Embodiment 3, an aperture diaphragm A is provided on the object side relative to the second lens unit G2 (between the second lens element L2 and the third lens element L3), and a plane parallel plate P is provided on the object side relative to the image surface S (between the image surface S and the sixth lens element L6).

In the zoom lens system according to Embodiment 3, in zooming from a wide-angle limit to a telephoto limit at the time of image taking, the first lens unit G1 moves to the object side with locus of a convex to the image side, the second lens unit G2 monotonically moves to the object side, and the third lens unit G3 moves to the image side with locus of a convex to the image side. That is, in zooming, the respective lens units individually move along the optical axis such that the interval between the first lens unit G1 and the second lens unit G2 should decrease, and the interval between the second lens unit G2 and the third lens unit G3 should increase. Further, in zooming from a wide-angle limit to a telephoto limit at the time of image taking, the aperture diaphragm A moves along the optical axis together with the second lens unit G2.

Further, in the zoom lens system according to Embodiment 3, in focusing from an infinity in-focus condition to a close-object in-focus condition, the third lens unit G3 moves to the object side along the optical axis.

Figure 10:
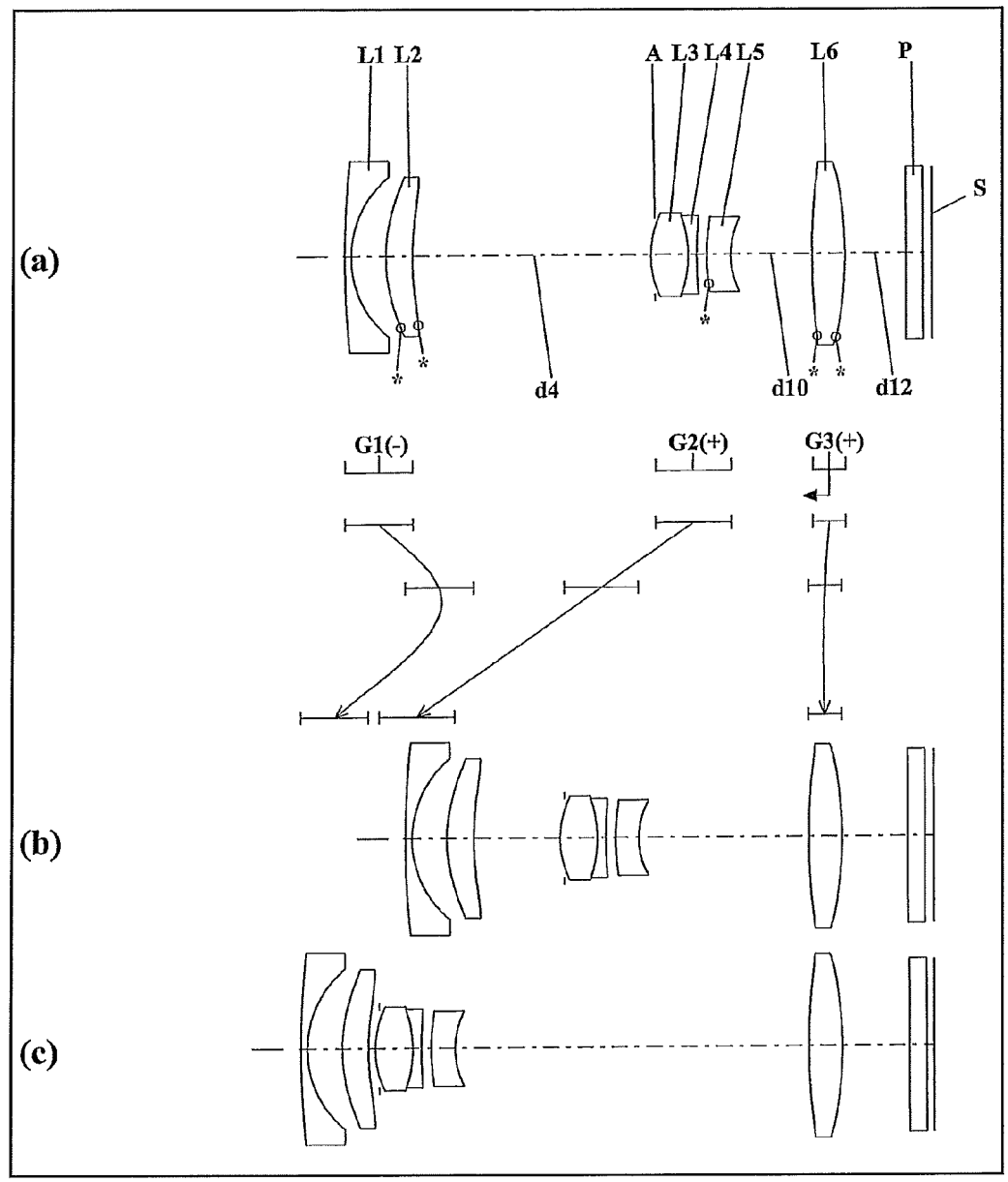
FIG. 10 is a lens arrangement diagram showing an infinity in-focus condition of a zoom lens system according to Embodiment 4 (Example 4)
Figure 11:
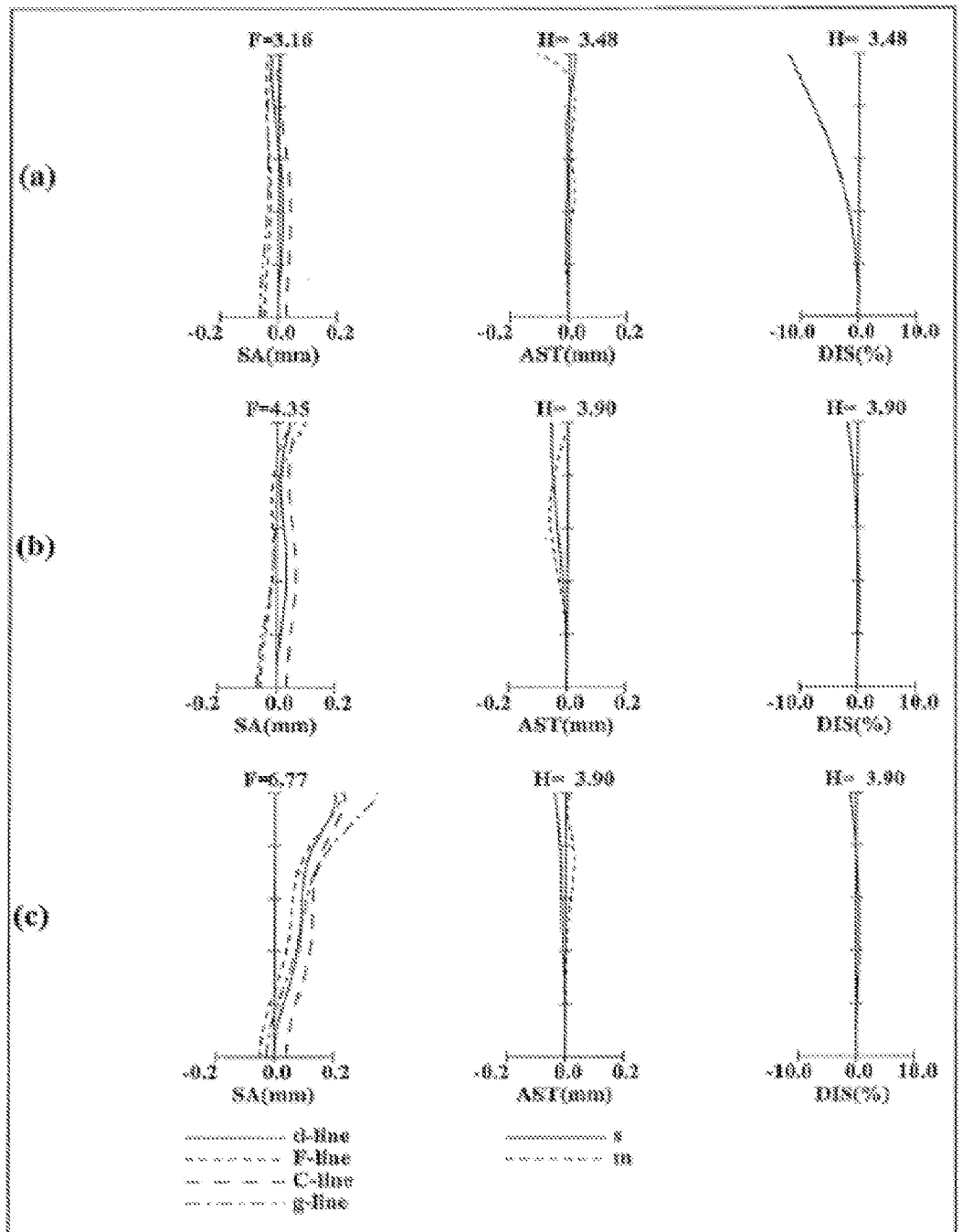
FIG. 11 is a longitudinal aberration diagram of an infinity in-focus condition of a zoom lens system according to Example 4.
Figure 12:
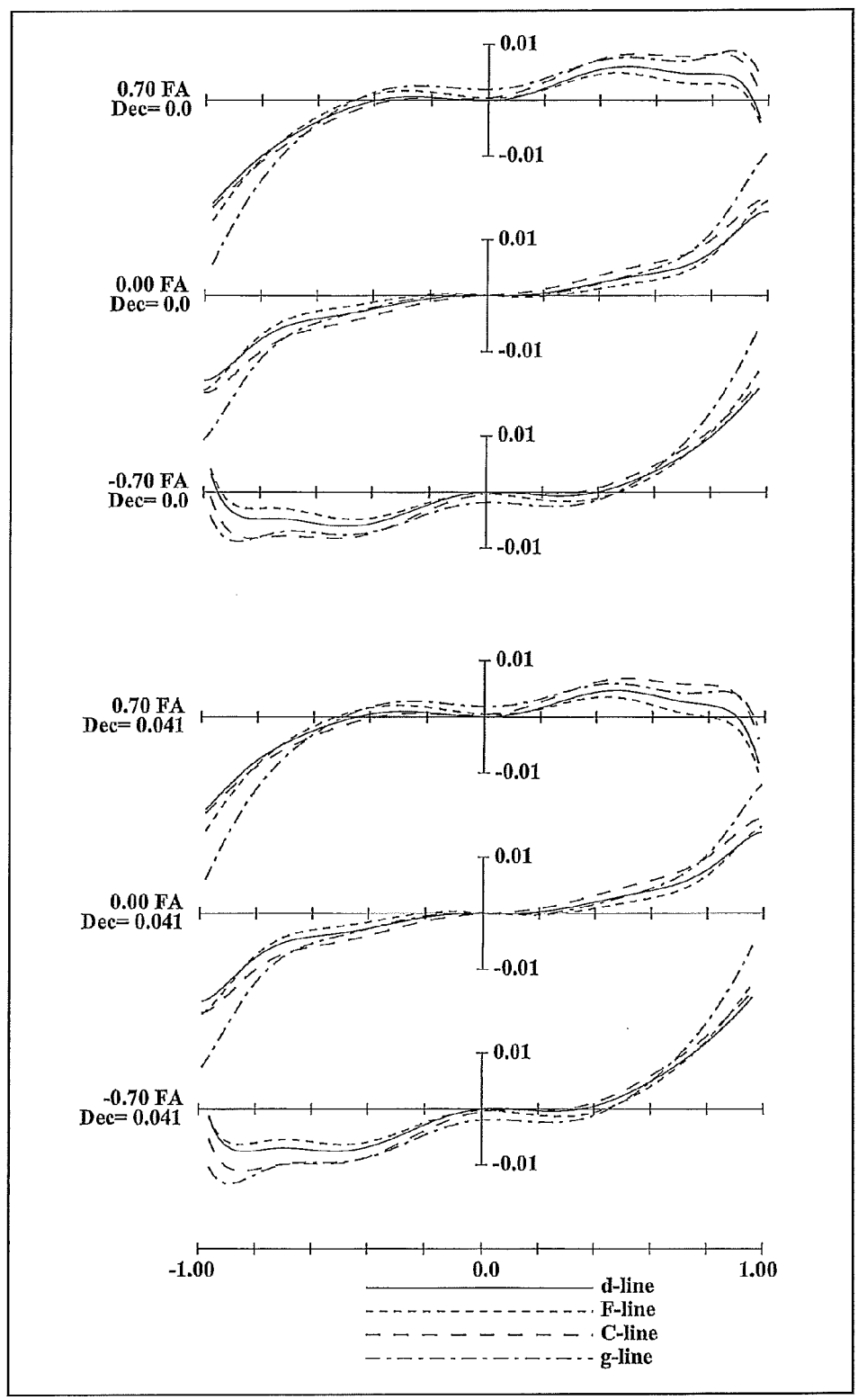
FIG. 12 is a lateral aberration diagram of a zoom lens system according to Example 4 at a telephoto limit in a basic state where image blur compensation is not performed and in a blur compensation state.

As shown in FIG. 10, in the zoom lens system according to Embodiment 4, the first lens unit G1, in order from the object side to the image side, comprises: a negative meniscus first lens element L1 with the convex surface facing the object side; and a positive meniscus second lens element L2 with the convex surface facing the object side. Among these, the second lens element L2 has two aspheric surfaces.

In the zoom lens system according to Embodiment 4, the second lens unit G2, in order from the object side to the image side, comprises: a bi-convex third lens element L3; a bi-concave fourth lens element L4; and a negative meniscus fifth lens element L5 with the convex surface facing the object side. Among these, the third lens element L3 and the fourth lens element L4 are cemented with each other. The fifth lens element L5 has an aspheric object side surface.

In the zoom lens system according to Embodiment 4, the third lens unit G3 comprises solely a bi-convex sixth lens element L6. The sixth lens element L6 has two aspheric surfaces.

In the zoom lens system according to Embodiment 4, an aperture diaphragm A is provided on the object side relative to the second lens unit G2 (between the second lens element L2 and the third lens element L3), and a plane parallel plate P is provided on the object side relative to the image surface S (between the image surface S and the sixth lens element L6).

In the zoom lens system according to Embodiment 4, in zooming from a wide-angle limit to a telephoto limit at the time of image taking, the first lens unit G1 moves to the object side with locus of a convex to the image side, the second lens unit G2 monotonically moves to the object side, and the third lens unit G3 moves to the object side with locus of a convex to the image side. That is, in zooming, the respective lens units individually move along the optical axis such that the interval between the first lens unit G1 and the second lens unit G2 should decrease, and the interval between the second lens unit G2 and the third lens unit G3 should increase. Further, in zooming from a wide-angle limit to a telephoto limit at the time of image taking, the aperture diaphragm A moves along the optical axis together with the second lens unit G2.

Further, in the zoom lens system according to Embodiment 4, in focusing from an infinity in-focus condition to a close-object in-focus condition, the third lens unit G3 moves to the object side along the optical axis.

Figure 13:
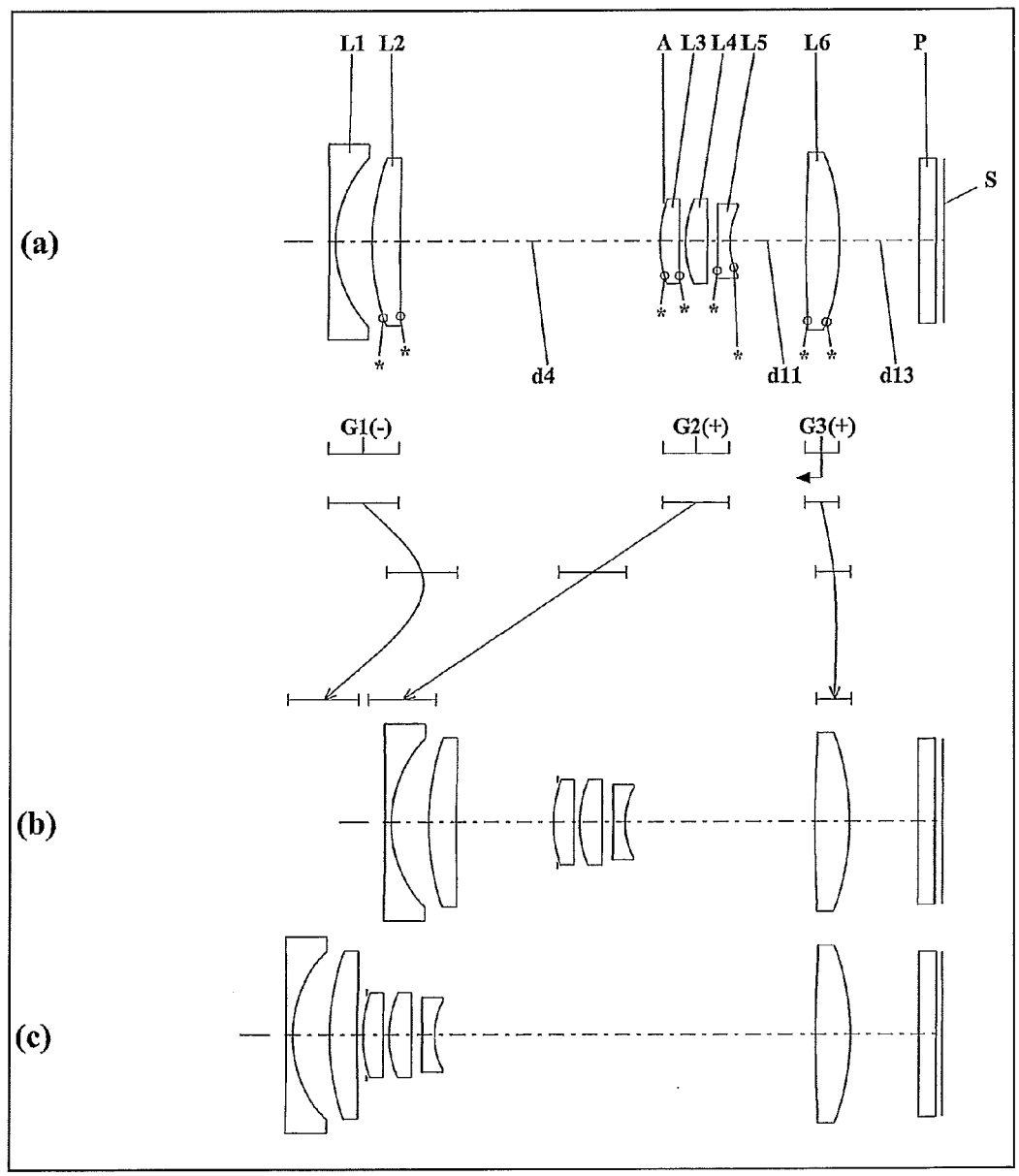
FIG. 13 is a lens arrangement diagram showing an infinity in-focus condition of a zoom lens system according to Embodiment 5 (Example 5)
Figure 14:
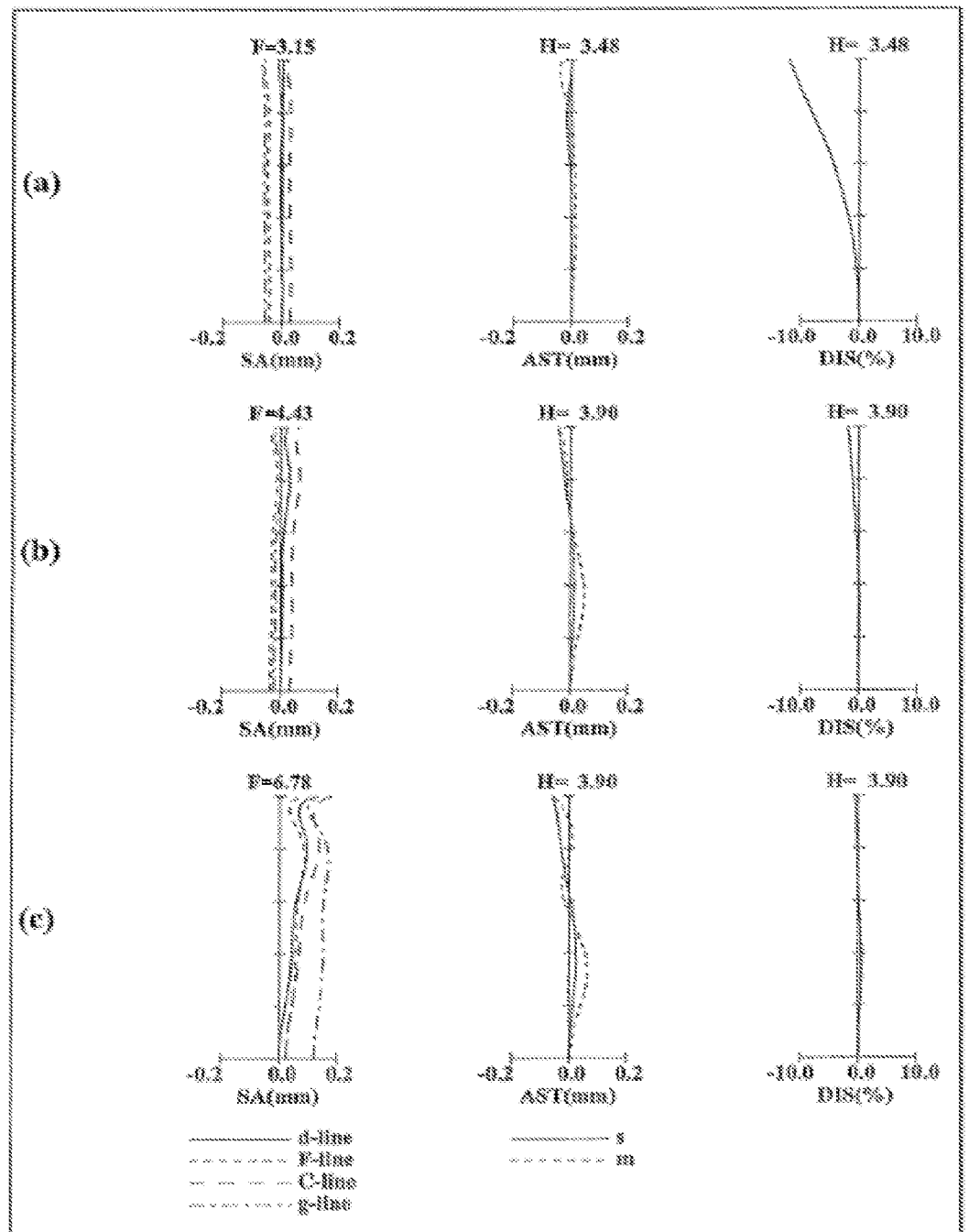
FIG. 14 is a longitudinal aberration diagram of an infinity in-focus condition of a zoom lens system according to Example 5.
Figure 15:
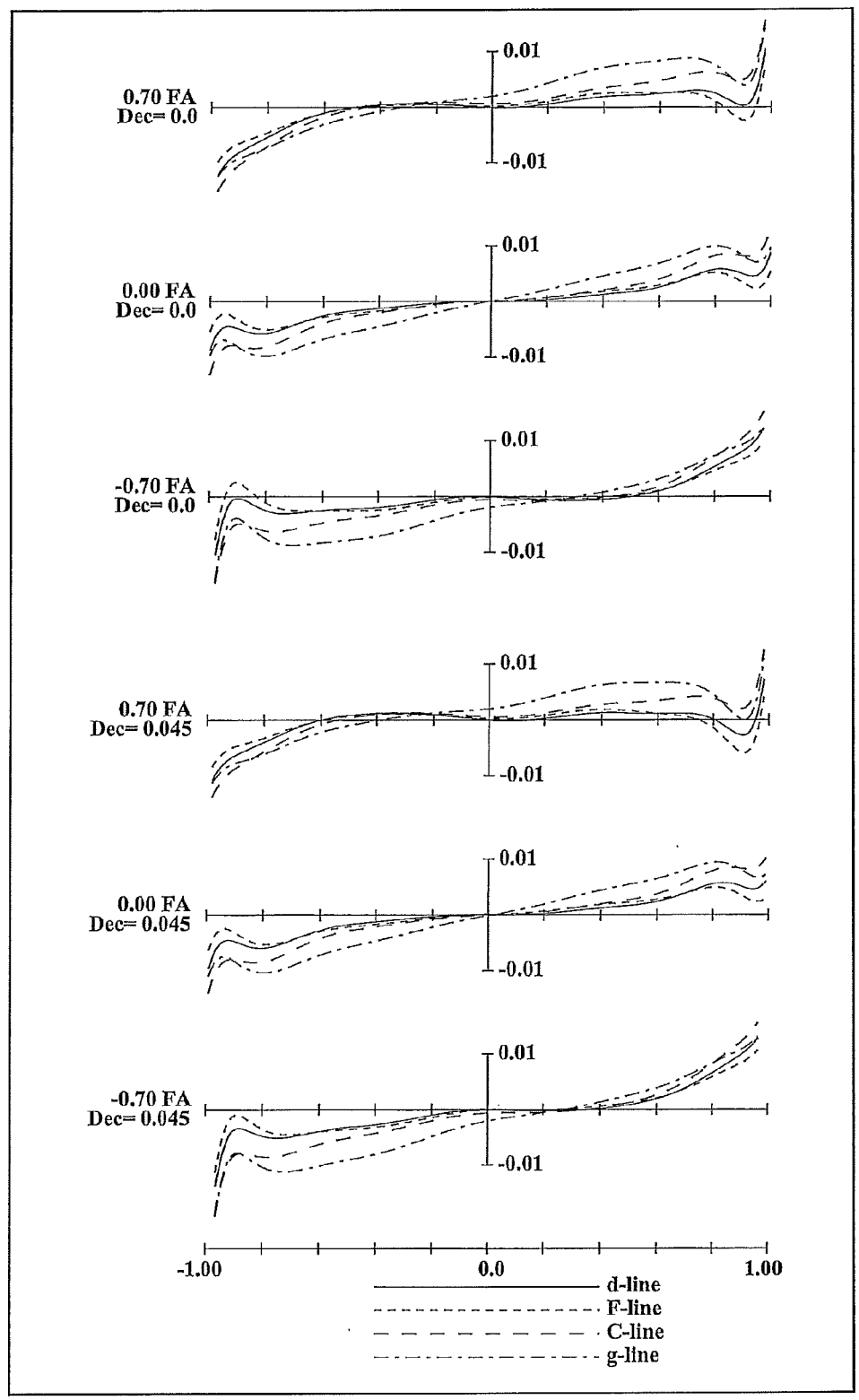
FIG. 15 is a lateral aberration diagram of a zoom lens system according to Example 5 at a telephoto limit in a basic state where image blur compensation is not performed and in a blur compensation state.

As shown in FIG. 13, in the zoom lens system according to Embodiment 5, the first lens unit G1, in order from the object side to the image side, comprises: a bi-concave first lens element L1; and a positive meniscus second lens element L2 with the convex surface facing the object side. Among these, the second lens element L2 has two aspheric surfaces.

In the zoom lens system according to Embodiment 5, the second lens unit G2, in order from the object side to the image side, comprises: a positive meniscus third lens element L3 with the convex surface facing the object side; a bi-convex fourth lens element L4; and a bi-concave fifth lens element L5. Among these, the third lens element L3 has two aspheric surfaces, and the fifth lens element L5 also has two aspheric surfaces.

In the zoom lens system according to Embodiment 5, the third lens unit G3 comprises solely a bi-convex sixth lens element L6. The sixth lens element L6 has two aspheric surfaces.

In the zoom lens system according to Embodiment 5, an aperture diaphragm A is provided on the object side relative to the second lens unit G2 (between the second lens element L2 and the third lens element L3), and a plane parallel plate P is provided on the object side relative to the image surface S (between the image surface S and the sixth lens element L6).

In the zoom lens system according to Embodiment 5, in zooming from a wide-angle limit to a telephoto limit at the time of image taking, the first lens unit G1 moves to the object side with locus of a convex to the image side, the second lens unit G2 monotonically moves to the object side, and the third lens unit G3 moves to the image side with locus of a convex to the image side. That is, in zooming, the respective lens units individually move along the optical axis such that the interval between the first lens unit G1 and the second lens unit G2 should decrease, and the interval between the second lens unit G2 and the third lens unit G3 should increase. Further, in zooming from a wide-angle limit to a telephoto limit at the time of image taking, the aperture diaphragm A moves along the optical axis together with the second lens unit G2.

Further, in the zoom lens system according to Embodiment 5, in focusing from an infinity in-focus condition to a close-object in-focus condition, the third lens unit G3 moves to the object side along the optical axis.

Figure 16:
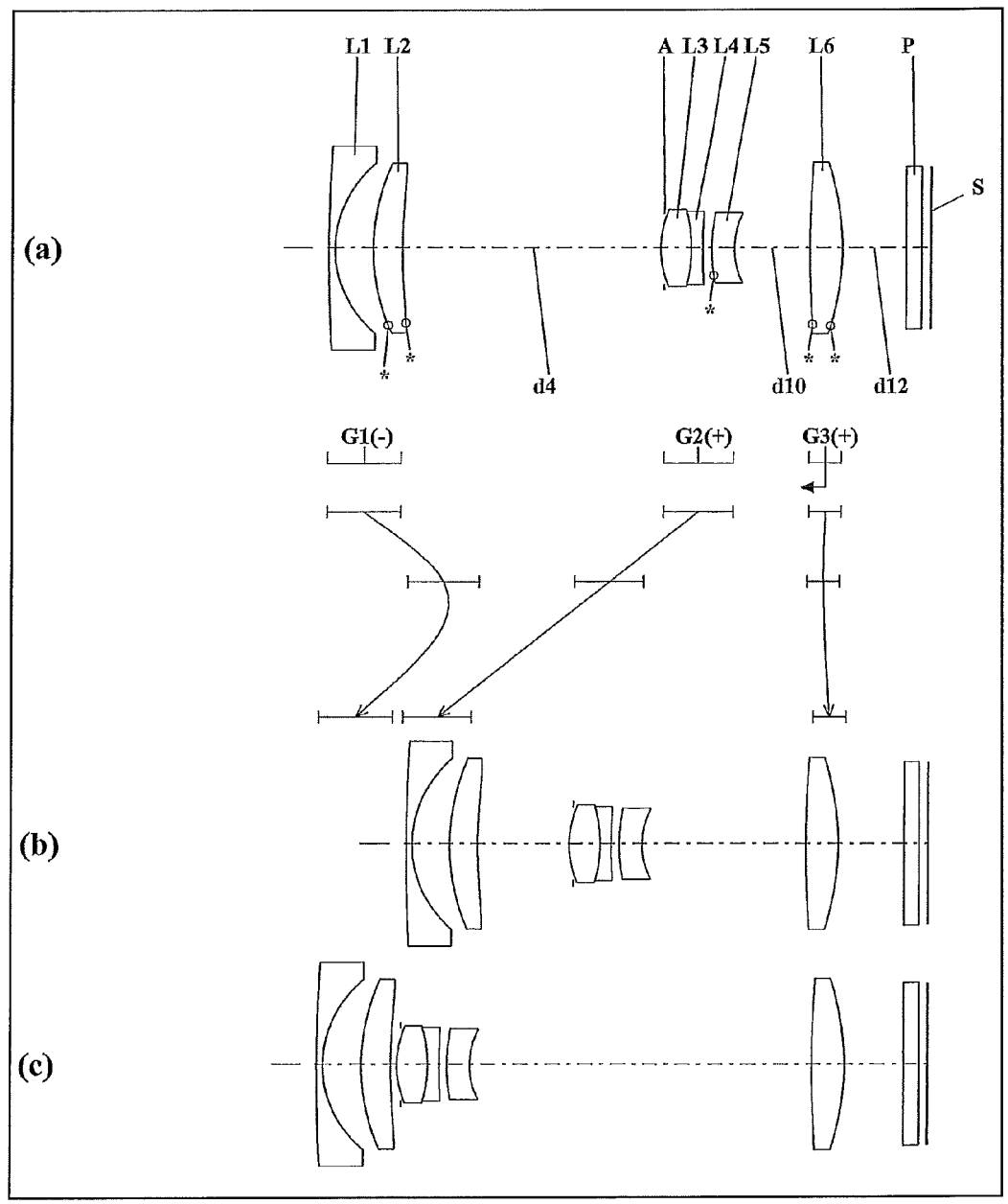
FIG. 16 is a lens arrangement diagram showing an infinity in-focus condition of a zoom lens system according to Embodiment 6 (Example 6)
Figure 17:
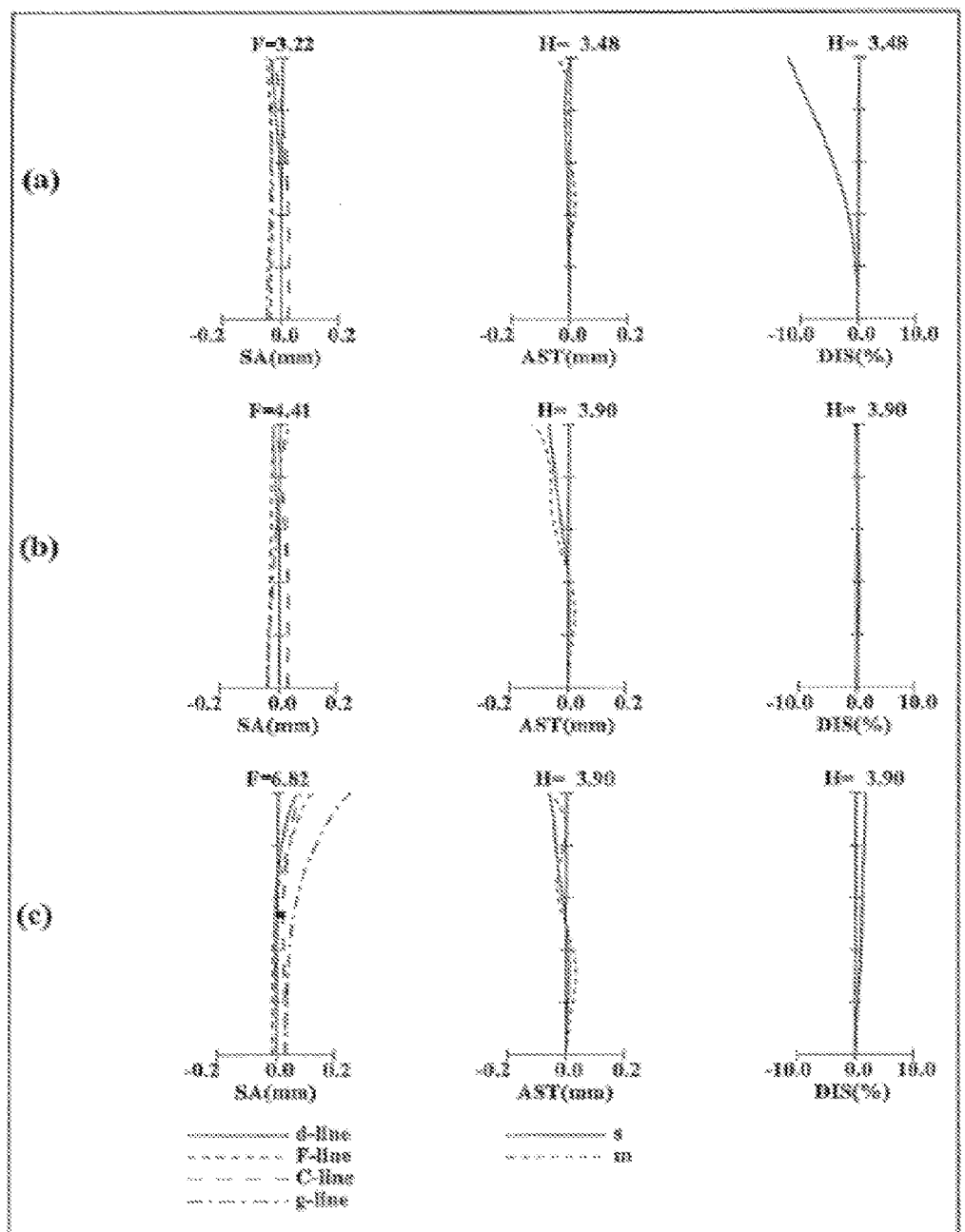
FIG. 17 is a longitudinal aberration diagram of an infinity in-focus condition of a zoom lens system according to Example 6.
Figure 18:
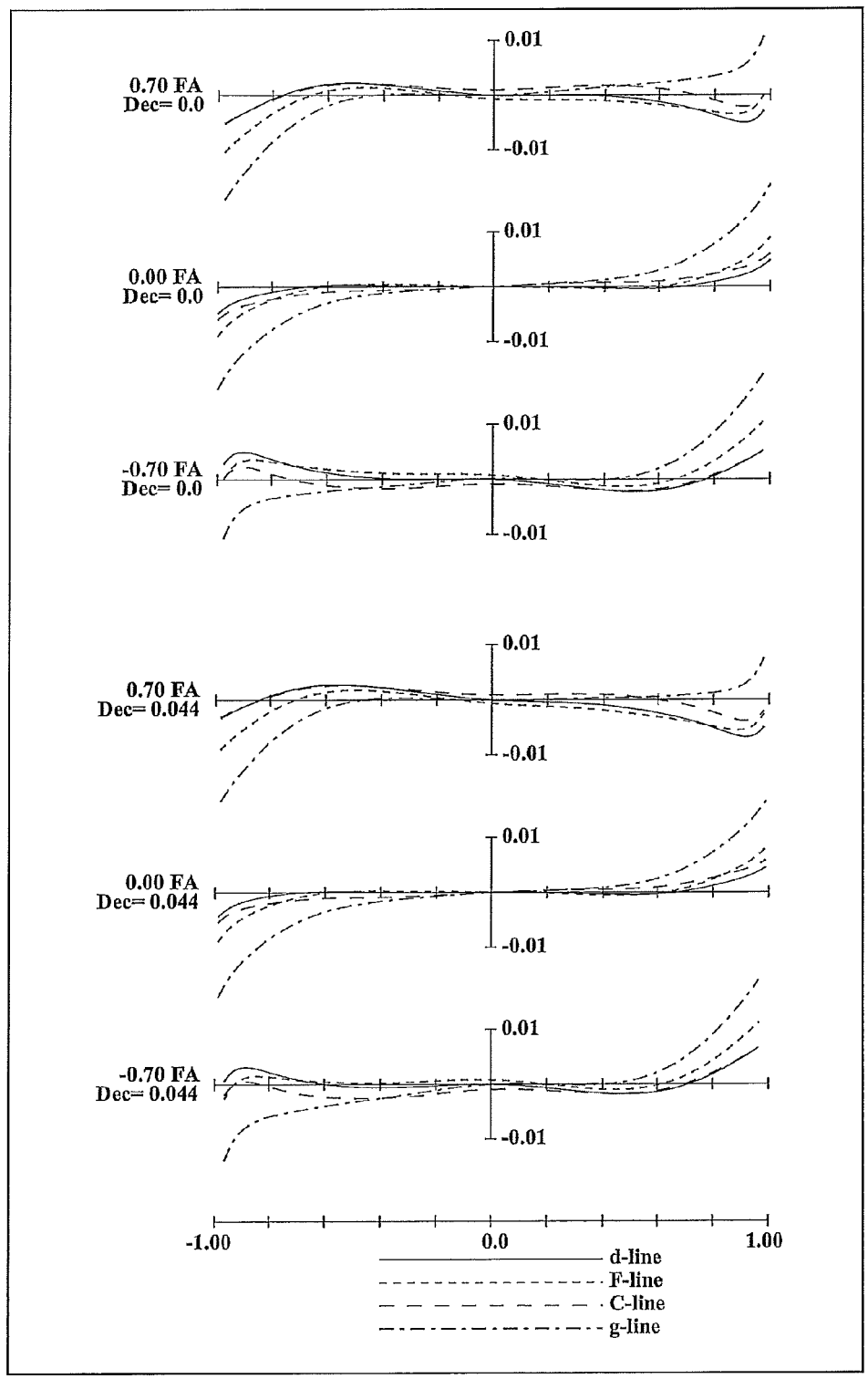
FIG. 18 is a lateral aberration diagram of a zoom lens system according to Example 6 at a telephoto limit in a basic state where image blur compensation is not performed and in a blur compensation state.

As shown in FIG. 16, in the zoom lens system according to Embodiment 6, the first lens unit G1, in order from the object side to the image side, comprises: a negative meniscus first lens element L1 with the convex surface facing the object side; and a positive meniscus second lens element L2 with the convex surface facing the object side. Among these, the second lens element L2 has two aspheric surfaces.

In the zoom lens system according to Embodiment 6, the second lens unit G2, in order from the object side to the image side, comprises: a bi-convex third lens element L3; a bi-concave fourth lens element L4; and a negative meniscus fifth lens element L5 with the convex surface facing the object side. Among these, the third lens element L3 and the fourth lens element L4 are cemented with each other. The fifth lens element L5 has an aspheric object side surface.

In the zoom lens system according to Embodiment 6, the third lens unit G3 comprises solely a bi-convex sixth lens element L6. The sixth lens element L6 has two aspheric surfaces.

In the zoom lens system according to Embodiment 6, an aperture diaphragm A is provided on the object side relative to the second lens unit G2 (between the second lens element L2 and the third lens element L3), and a plane parallel plate P is provided on the object side relative to the image surface S (between the image surface S and the sixth lens element L6).

In the zoom lens system according to Embodiment 6, in zooming from a wide-angle limit to a telephoto limit at the time of image taking, the first lens unit G1 moves to the object side with locus of a convex to the image side, the second lens unit G2 monotonically moves to the object side, and the third lens unit G3 moves to the image side with locus of a convex to the object side. That is, in zooming, the respective lens units individually move along the optical axis such that the interval between the first lens unit G1 and the second lens unit G2 should decrease, and the interval between the second lens unit G2 and the third lens unit G3 should increase. Further, in zooming from a wide-angle limit to a telephoto limit at the time of image taking, the aperture diaphragm A moves along the optical axis together with the second lens unit G2.

Further, in the zoom lens system according to Embodiment 6, in focusing from an infinity in-focus condition to a close-object in-focus condition, the third lens unit G3 moves to the object side along the optical axis.

Figure 19:
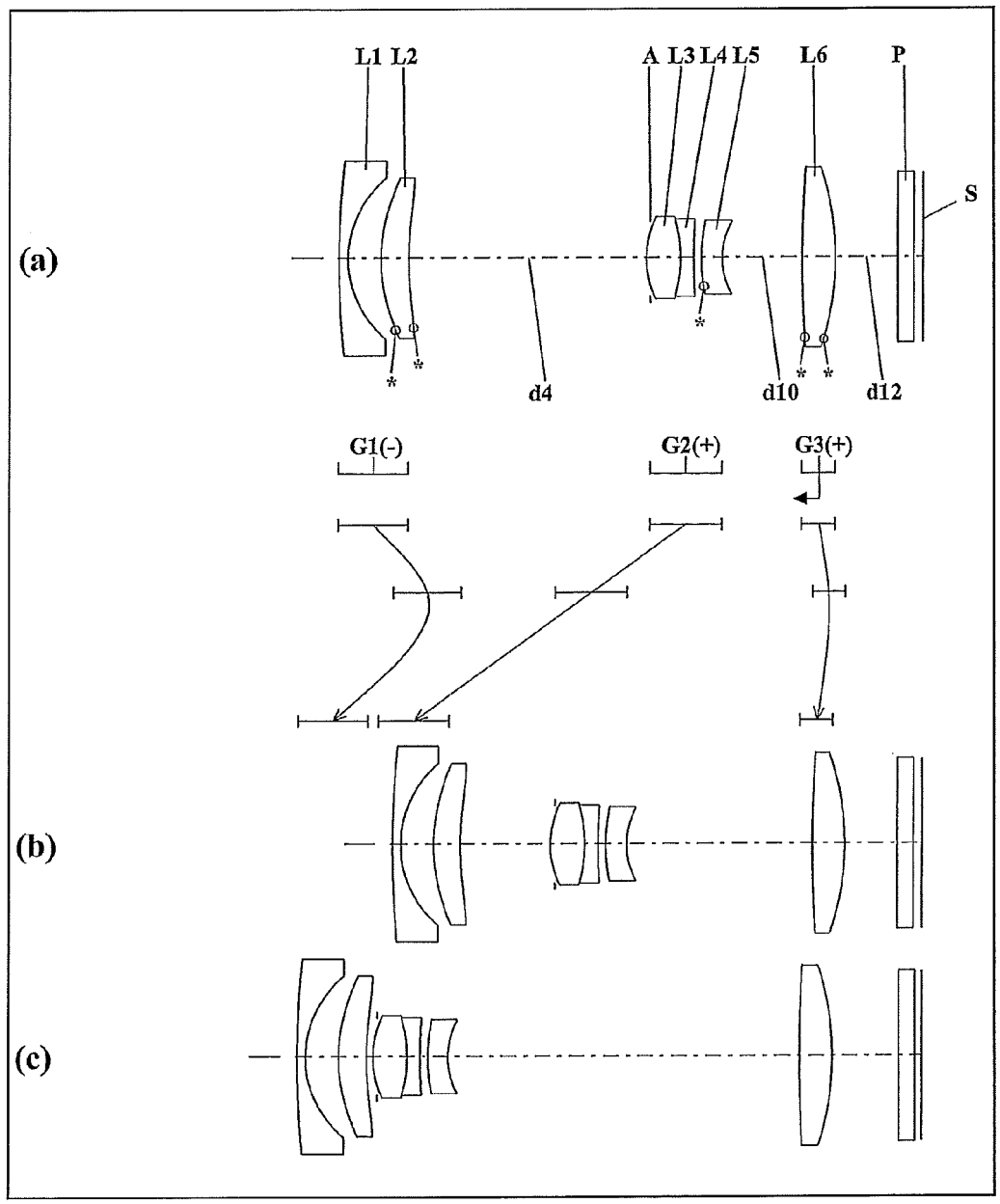
FIG. 19 is a lens arrangement diagram showing an infinity in-focus condition of a zoom lens system according to Embodiment 7 (Example 7)
Figure 20:
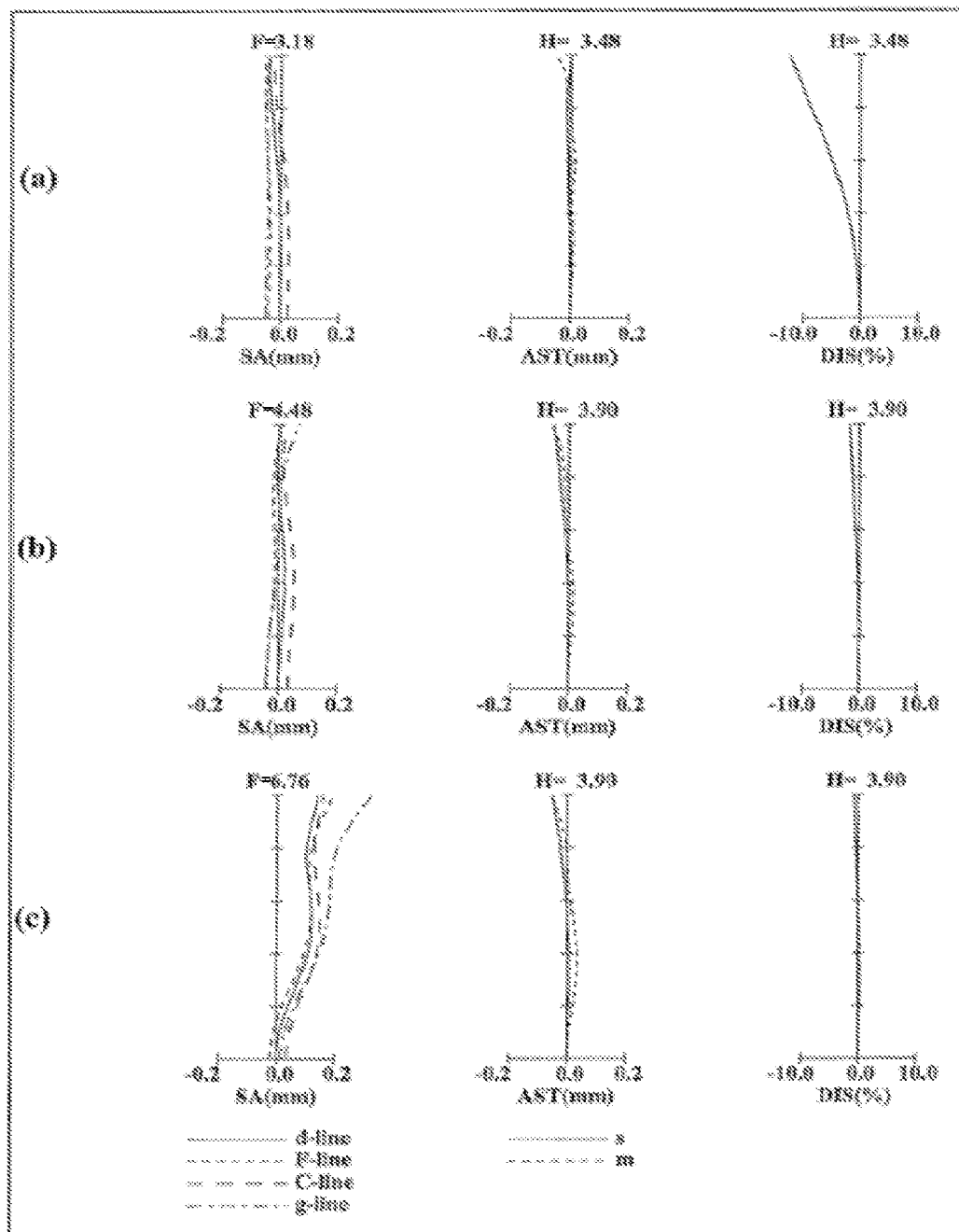
FIG. 20 is a longitudinal aberration diagram of an infinity in-focus condition of a zoom lens system according to Example 7.
Figure 21:
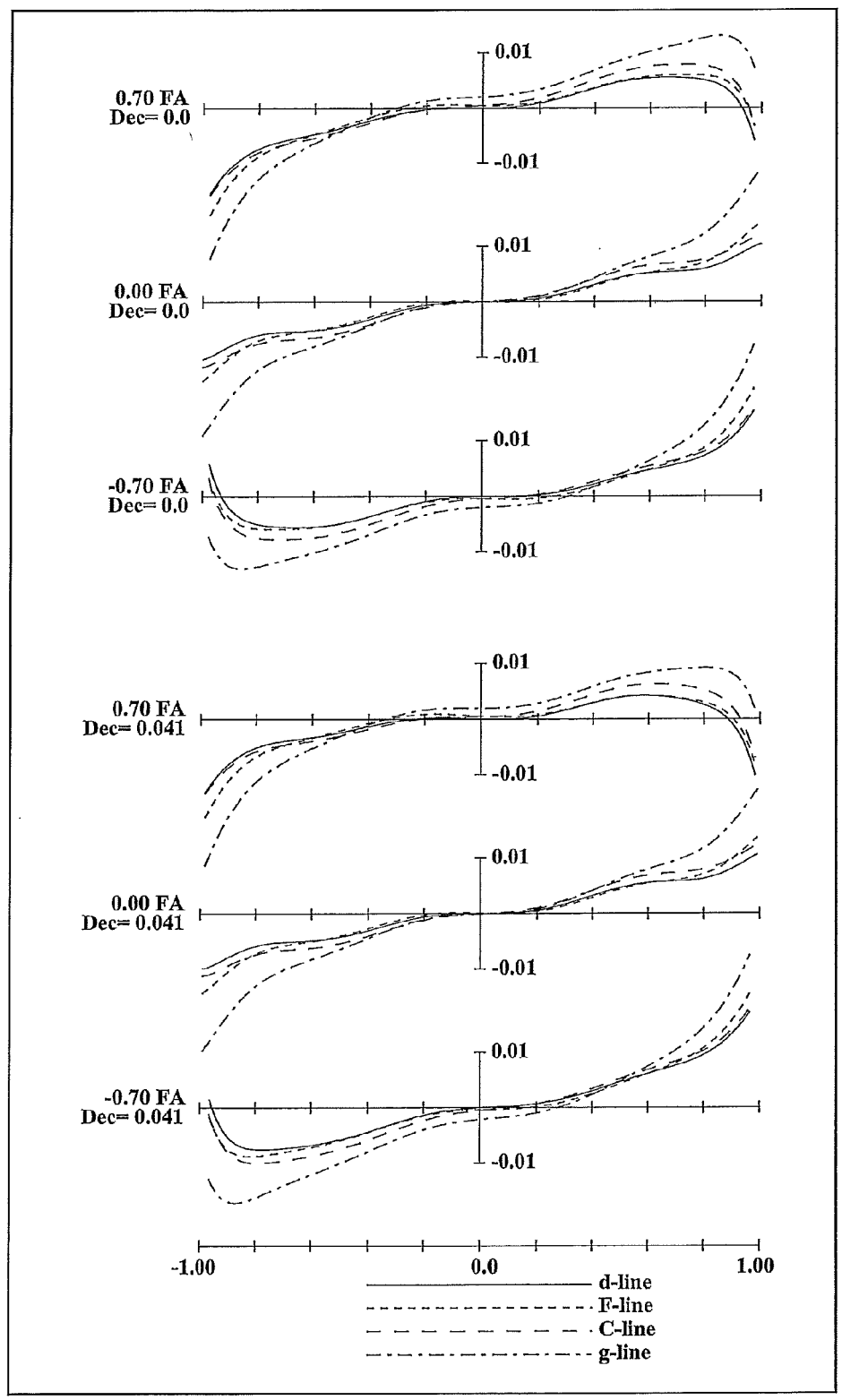
FIG. 21 is a lateral aberration diagram of a zoom lens system according to Example 7 at a telephoto limit in a basic state where image blur compensation is not performed and in a blur compensation state.

As shown in FIG. 19, in the zoom lens system according to Embodiment 7, the first lens unit G1, in order from the object side to the image side, comprises: a negative meniscus first lens element L1 with the convex surface facing the object side; and a positive meniscus second lens element L2 with the convex surface facing the object side. Among these, the second lens element L2 has two aspheric surfaces.

In the zoom lens system according to Embodiment 7, the second lens unit G2, in order from the object side to the image side, comprises: a bi-convex third lens element L3; a bi-concave fourth lens element L4; and a negative meniscus fifth lens element L5 with the convex surface facing the object side. Among these, the third lens element L3 and the fourth lens element L4 are cemented with each other. The fifth lens element L5 has an aspheric object side surface.

In the zoom lens system according to Embodiment 7, the third lens unit G3 comprises solely a bi-convex sixth lens element L6. The sixth lens element L6 has two aspheric surfaces.

In the zoom lens system according to Embodiment 7, an aperture diaphragm A is provided on the object side relative to the second lens unit G2 (between the second lens element L2 and the third lens element L3), and a plane parallel plate P is provided on the object side relative to the image surface S (between the image surface S and the sixth lens element L6).

In the zoom lens system according to Embodiment 7, in zooming from a wide-angle limit to a telephoto limit at the time of image taking, the first lens unit G1 moves to the object side with locus of a convex to the image side, the second lens unit G2 monotonically moves to the object side, and the third lens unit G3 moves to the object side with locus of a convex to the image side. That is, in zooming, the respective lens units individually move along the optical axis such that the interval between the first lens unit G1 and the second lens unit G2 should decrease, and the interval between the second lens unit G2 and the third lens unit G3 should increase. Further, in zooming from a wide-angle limit to a telephoto limit at the time of image taking, the aperture diaphragm A moves along the optical axis together with the second lens unit G2.

Further, in the zoom lens system according to Embodiment 7, in focusing from an infinity in-focus condition to a close-object in-focus condition, the third lens unit G3 moves to the object side along the optical axis.

Figure 22:
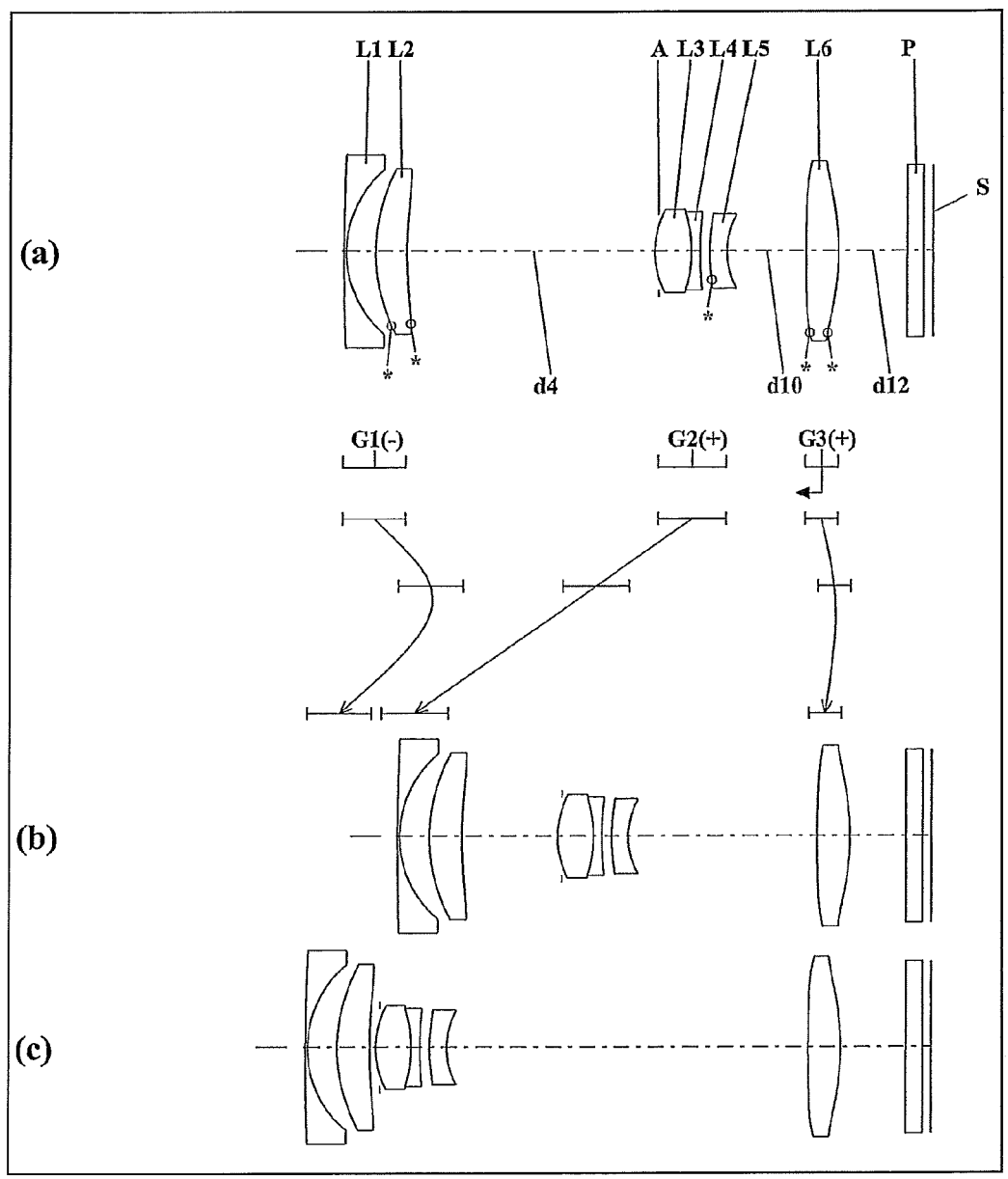
FIG. 22 is a lens arrangement diagram showing an infinity in-focus condition of a zoom lens system according to Embodiment 8 (Example 8)
Figure 23:
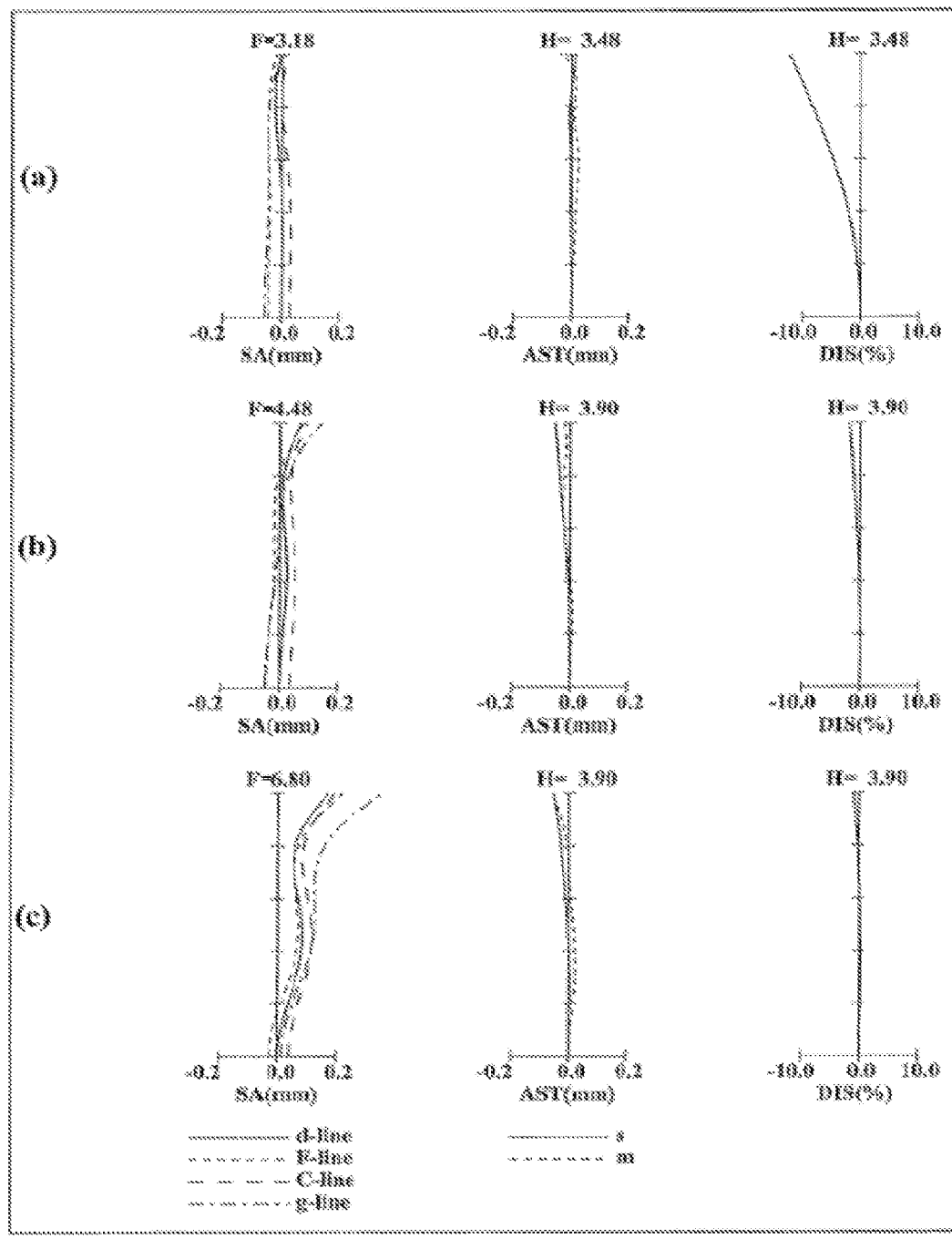
FIG. 23 is a longitudinal aberration diagram of an infinity in-focus condition of a zoom lens system according to Example 8.
Figure 24:
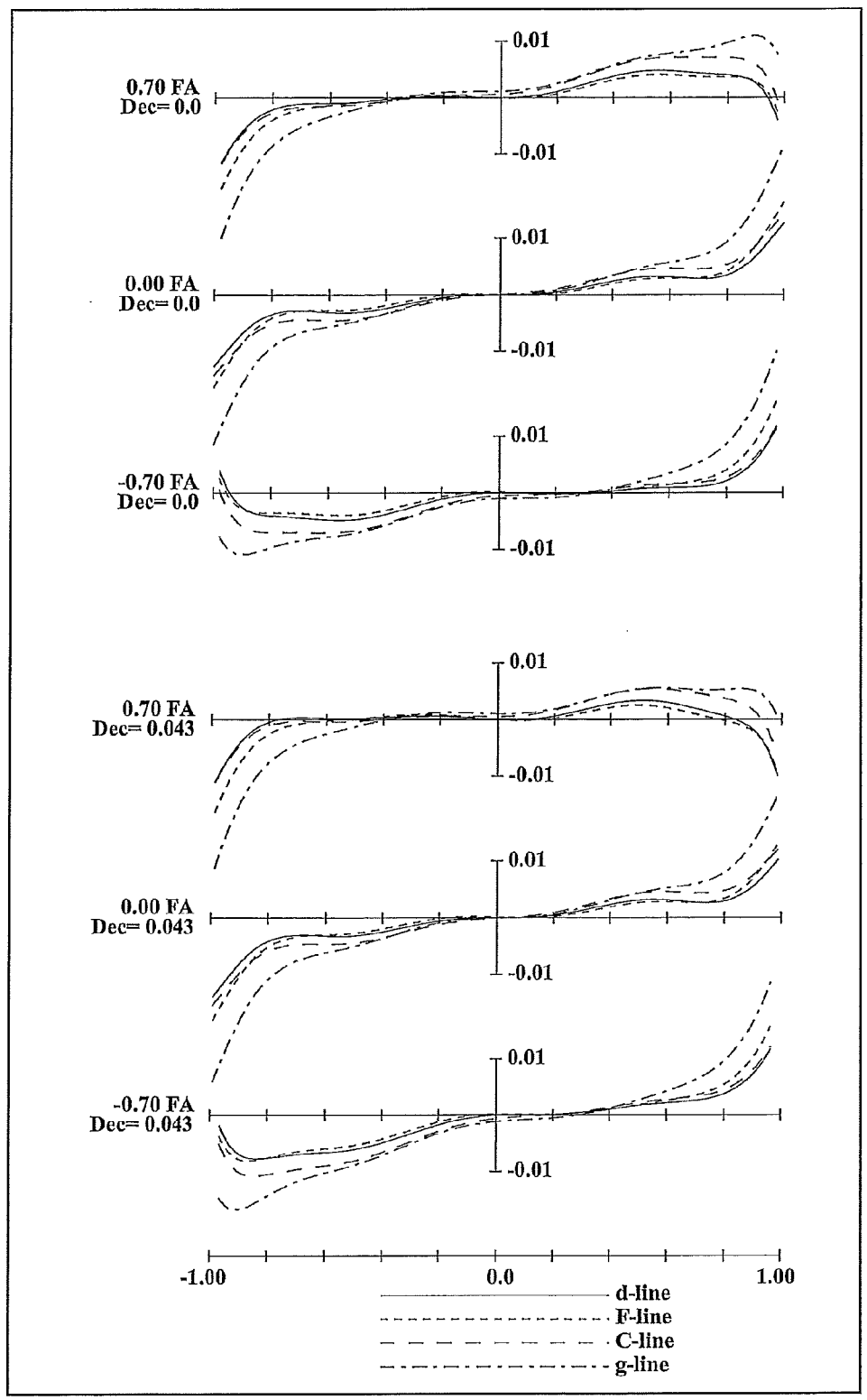
FIG. 24 is a lateral aberration diagram of a zoom lens system according to Example 8 at a telephoto limit in a basic state where image blur compensation is not performed and in a blur compensation state.

As shown in FIG. 22, in the zoom lens system according to Embodiment 8, the first lens unit G1, in order from the object side to the image side, comprises: a negative meniscus first lens element L1 with the convex surface facing the object side; and a positive meniscus second lens element L2 with the convex surface facing the object side. Among these, the second lens element L2 has two aspheric surfaces.

In the zoom lens system according to Embodiment 8, the second lens unit G2, in order from the object side to the image side, comprises: a bi-convex third lens element L3; a bi-concave fourth lens element L4; and a negative meniscus fifth lens element L5 with the convex surface facing the object side. Among these, the third lens element L3 and the fourth lens element L4 are cemented with each other. The fifth lens element L5 has an aspheric object side surface.

In the zoom lens system according to Embodiment 8, the third lens unit G3 comprises solely a bi-convex sixth lens element L6. The sixth lens element L6 has two aspheric surfaces.

In the zoom lens system according to Embodiment 8, an aperture diaphragm A is provided on the object side relative to the second lens unit G2 (between the second lens element L2 and the third lens element L3), and a plane parallel plate P is provided on the object side relative to the image surface S (between the image surface S and the sixth lens element L6).

In the zoom lens system according to Embodiment 8, in zooming from a wide-angle limit to a telephoto limit at the time of image taking, the first lens unit G1 moves to the object side with locus of a convex to the image side, the second lens unit G2 monotonically moves to the object side, and the third lens unit G3 moves to the image side with locus of a convex to the image side. That is, in zooming, the respective lens units individually move along the optical axis such that the interval between the first lens unit G1 and the second lens unit G2 should decrease, and the interval between the second lens unit G2 and the third lens unit G3 should increase. Further, in zooming from a wide-angle limit to a telephoto limit at the time of image taking, the aperture diaphragm A moves along the optical axis together with the second lens unit G2.

Further, in the zoom lens system according to Embodiment 8, in focusing from an infinity in-focus condition to a close-object in-focus condition, the third lens unit G3 moves to the object side along the optical axis.

Figure 25:
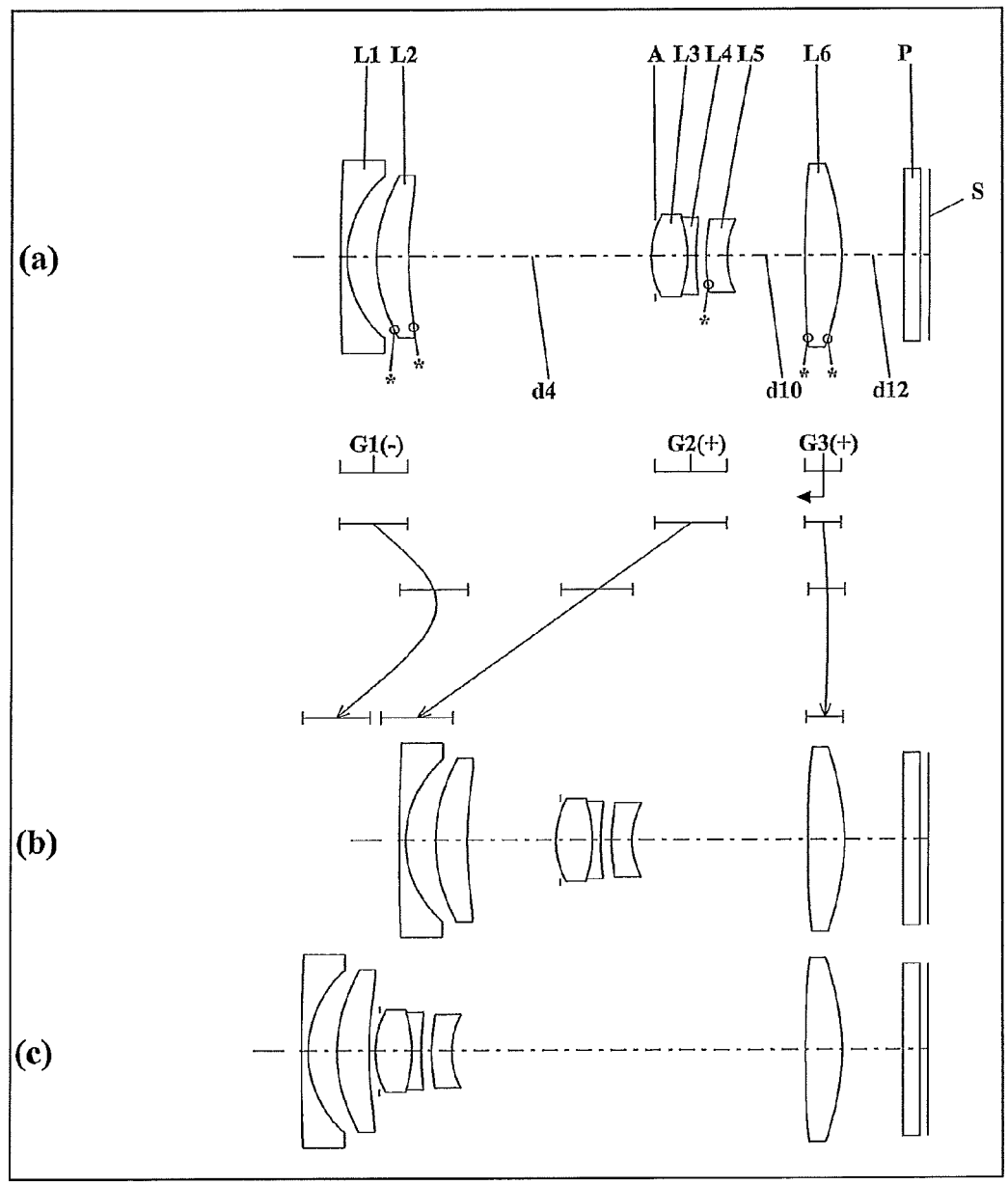
FIG. 25 is a lens arrangement diagram showing an infinity in-focus condition of a zoom lens system according to Embodiment 9 (Example 9)
Figure 26:
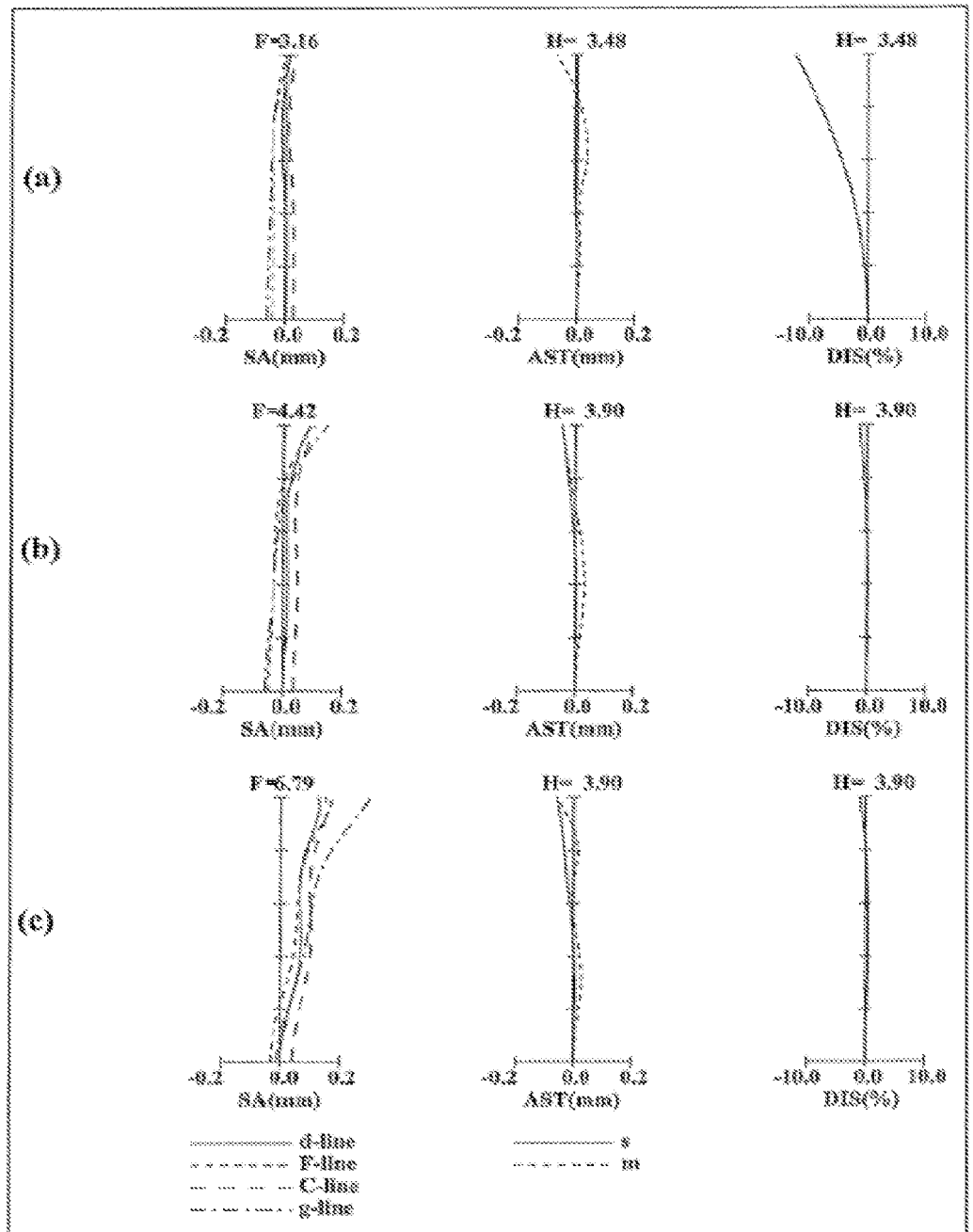
FIG. 26 is a longitudinal aberration diagram of an infinity in-focus condition of a zoom lens system according to Example 9.
Figure 27:
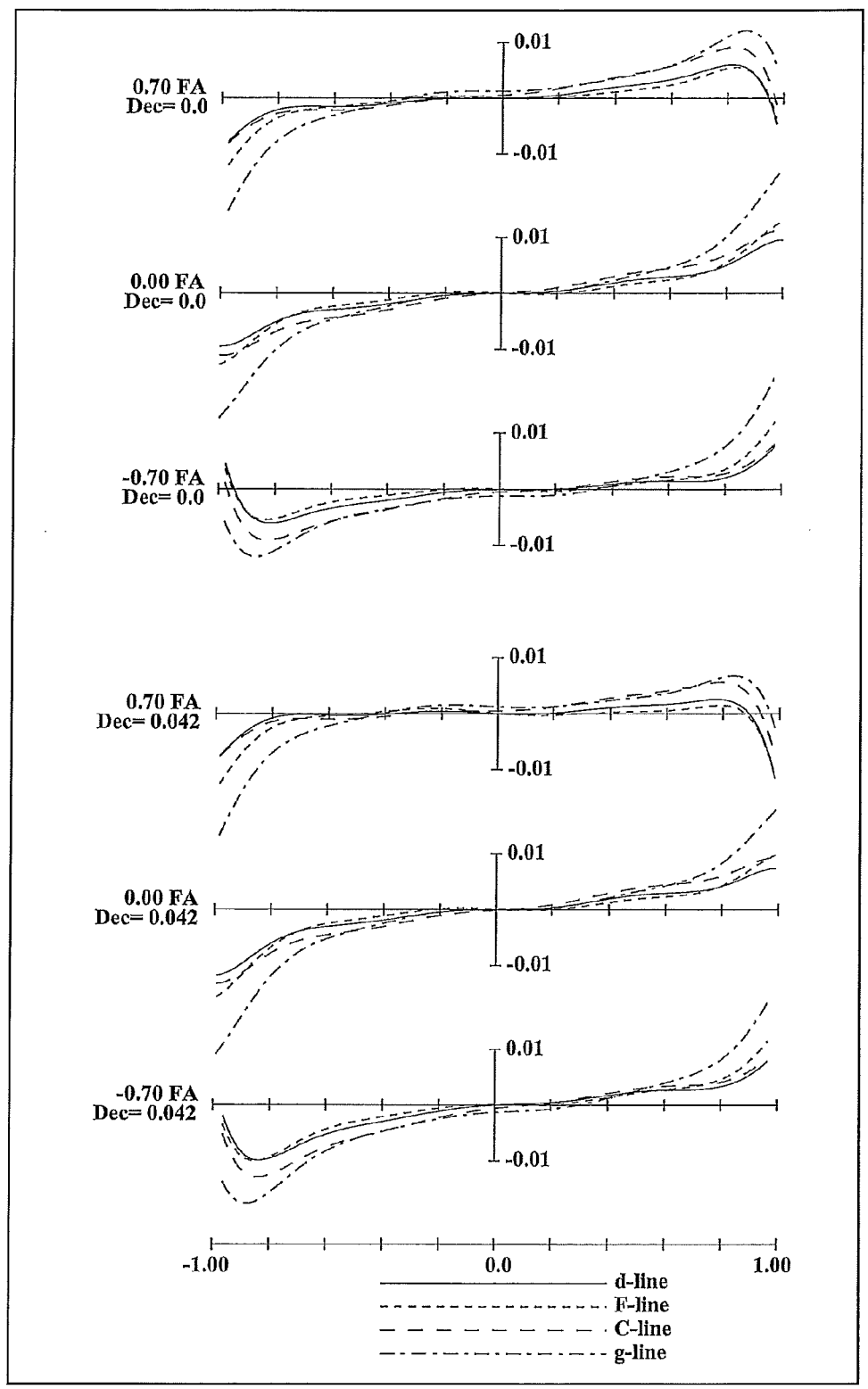
FIG. 27 is a lateral aberration diagram of a zoom lens system according to Example 9 at a telephoto limit in a basic state where image blur compensation is not performed and in a blur compensation state.

As shown in FIG. 25, in the zoom lens system according to Embodiment 9, the first lens unit G1, in order from the object side to the image side, comprises: a negative meniscus first lens element L1 with the convex surface facing the object side; and a positive meniscus second lens element L2 with the convex surface facing the object side. Among these, the second lens element L2 has two aspheric surfaces.

In the zoom lens system according to Embodiment 9, the second lens unit G2, in order from the object side to the image side, comprises: a bi-convex third lens element L3; a bi-concave fourth lens element L4; and a negative meniscus fifth lens element L5 with the convex surface facing the object side. Among these, the third lens element L3 and the fourth lens element L4 are cemented with each other. The fifth lens element L5 has an aspheric object side surface.

In the zoom lens system according to Embodiment 9, the third lens unit G3 comprises solely a bi-convex sixth lens element L6. The sixth lens element L6 has two aspheric surfaces.

In the zoom lens system according to Embodiment 9, an aperture diaphragm A is provided on the object side relative to the second lens unit G2 (between the second lens element L2 and the third lens element L3), and a plane parallel plate P is provided on the object side relative to the image surface S (between the image surface S and the sixth lens element L6).

In the zoom lens system according to Embodiment 9, in zooming from a wide-angle limit to a telephoto limit at the time of image taking, the first lens unit G1 moves to the object side with locus of a convex to the image side, the second lens unit G2 monotonically moves to the object side, and the third lens unit G3 moves to the image side with locus of a convex to the image side. That is, in zooming, the respective lens units individually move along the optical axis such that the interval between the first lens unit G1 and the second lens unit G2 should decrease, and the interval between the second lens unit G2 and the third lens unit G3 should increase. Further, in zooming from a wide-angle limit to a telephoto limit at the time of image taking, the aperture diaphragm A moves along the optical axis together with the second lens unit G2.

Further, in the zoom lens system according to Embodiment 9, in focusing from an infinity in-focus condition to a close-object in-focus condition, the third lens unit G3 moves to the object side along the optical axis.

In the zoom lens systems according to Embodiments 1 to 9, the first lens unit G1 is, in order from the object side to the image side, composed of: a lens element having negative optical power; and a meniscus lens element having positive optical power, and a convex surface facing the object side. Therefore, a short overall length of each lens system is realized while favorably compensating various aberrations, particularly distortion at a wide-angle limit.

In the zoom lens systems according to Embodiments 1 to 9, since the first lens unit G1 includes at least one lens element having an aspheric surface, the distortion can be compensated more favorably.

In the zoom lens systems according to Embodiments 1 to 9, since the second lens unit G2 includes at least one lens element having an aspheric surface, various aberrations, particularly spherical aberration, can be compensated favorably. Further, since the second lens unit G2 is composed of three lens elements each having optical power, a reduction in the overall length of lens system is achieved.

In the zoom lens systems according to Embodiments 1 to 9, since the third lens unit G3 is composed of one lens element, the total number of lens elements is reduced, resulting in a reduction in the overall length of lens system. Further, in focusing from an infinity in-focus condition to a close-object in-focus condition, the third lens unit G3, which is located closer to the image side than the aperture diaphragm A and is composed of one lens element, moves along the optical axis. Therefore, rapid focusing is easily performed, and high optical performance is realized particularly in the close-object in-focus condition. Furthermore, since the one lens element, which moves along the optical axis in focusing, has an aspheric surface, off-axial curvature of field from a wide-angle limit to a telephoto limit can be favorably compensated.

In the zoom lens systems according to Embodiments 1 to 9, in zooming from a wide-angle limit to a telephoto limit at the time of image taking, zooming is performed such that the first lens unit G1, the second lens unit G2, and the third lens unit G3 are individually moved along the optical axis. By moving any one of the first lens unit G1, the second lens unit G2 and the third lens unit G3, or a sub lens unit which is a part of each lens unit in a direction perpendicular to the optical axis, image point movement caused by vibration of the entire system can be compensated, that is, image blur caused by hand blurring, vibration and the like can be compensated optically. When compensating image point movement caused by vibration of the entire system, if the second lens unit G2 moves in the direction perpendicular to the optical axis, image blur can be compensated in such a manner that size increase in the entire zoom lens system is suppressed while excellent imaging characteristics such as small decentering coma aberration and small decentering astigmatism are satisfied.

It should be noted that a sub lens unit which is a part of each lens unit represents, when one lens unit is composed of a plurality of lens elements, any one lens element or a plurality of adjacent lens elements among the plurality of lens elements.

The following description is given for conditions preferred to be satisfied by a zoom lens system like the zoom lens systems according to Embodiments 1 to 9. Here, a plurality of preferable conditions are set forth for the zoom lens system according to each embodiment. A construction that satisfies all the plurality of conditions is most desirable for the zoom lens system. However, when an individual condition is satisfied, a zoom lens system having the corresponding effect is obtained.

For example, in a zoom lens system like the zoom lens systems according to Embodiments 1 to 9, which comprises, in order from the object side to the image side, a first lens unit having negative optical power, a second lens unit having positive optical power, and a third lens unit having positive optical power, in which the first lens unit, the second lens unit, and the third lens unit are individually moved along the optical axis in zooming from a wide-angle limit to a telephoto limit at the time of image taking, thereby to vary magnification, the first lens unit is composed of two lens elements, the third lens unit is composed of one lens element, and the first lens unit includes a lens element having at least one aspheric surface and positive optical power (this lens configuration is referred to as a basic configuration of the embodiment, hereinafter), the following condition (1) is satisfied.

$$1.74 < Ir/\sqrt{(|D_{L1} \times f_{G1}|)} \quad (1)$$

where
$D_{L1}$ is an optical axial thickness of a first lens element located on the object side in the first lens unit,
$f_{G1}$ is a focal length of the first lens unit,
Ir is a maximum image height (Ir=$f_T \times \tan(\omega_T)$),
$f_T$ is a focal length of the entire system at a telephoto limit, and
$\omega_T$ is a half value (°) of maximum view angle at a telephoto limit.

The condition (1) sets forth the relationship between the optical axial thickness of the first lens element located on the object side in the first lens unit, and the focal length of the first lens unit. If the condition (1) is not satisfied, the refractive power of the first lens unit is reduced, and the outer diameter of the first lens unit is increased to keep a wide view angle, which makes it difficult to secure compactness.

When the following condition (1)' is satisfied, the above-mentioned effect is achieved more successfully.

$$1.90 < Ir/\sqrt{(|D_{L1} \times f_{G1}|)} \quad (1)'$$

In a zoom lens system having the basic configuration like the zoom lens systems according to Embodiments 1 to 9, it is preferable that the first lens unit includes at least one lens element that satisfies the following conditions (2), (3) and (4).

$$nd \leq 1.67 \quad (2)$$

$$vd < 59 \quad (3)$$

$$0.000 < PgF + 0.002 \times vd - 0.664 \quad (4)$$

where
nd is a refractive index to the d-line of the lens element,
vd is an Abbe number to the d-line of the lens element, and
PgF is a partial dispersion ratio of the lens element, which is the ratio of a difference between a refractive index to the g-line and a refractive index to the F-line, to a difference between a refractive index to the F-line and a refractive index to the C-line.

The condition (2) relates to the refractive index to the d-line of the lens element included in the first lens unit. If the condition (2) is not satisfied, it becomes difficult to control fluctuation in curvature of field caused by zooming. The condition (3) relates to the Abbe number to the d-line of the lens element included in the first lens unit. If the condition (3) is not satisfied, it becomes difficult to control fluctuation in axial chromatic aberration caused by zooming. The condition (4) relates to anomalous dispersion according to the Abbe number of the lens element included in the first lens unit. If the condition (4) is not satisfied, it becomes difficult to control balance between a secondary spectrum and monochromatic aberration, which are generated at a telephoto limit.

When the lens element included in the first lens unit further satisfies the following condition (4)' in addition to the conditions (2) and (3), the above-mentioned effect is achieved more successfully.

$$0.005 < PgF + 0.002 \times vd - 0.664 \quad (4)'$$

In a zoom lens system having the basic configuration like the zoom lens systems according to Embodiments 1 to 9, it is preferable that the second lens unit includes at least one lens element that satisfies the following conditions (5), (6) and (7).

$$nd \leq 1.67 \quad (5)$$

$$vd < 59 \quad (6)$$

$$0.000 < PgF + 0.002 \times vd - 0.664 \quad (7)$$

where
nd is a refractive index to the d-line of the lens element,
vd is an Abbe number to the d-line of the lens element, and
PgF is a partial dispersion ratio of the lens element, which is the ratio of a difference between a refractive index to the g-line and a refractive index to the F-line, to a difference between a refractive index to the F-line and a refractive index to the C-line.

The condition (5) relates to the refractive index to the d-line of the lens element included in the second lens unit. If the condition (5) is not satisfied, it becomes difficult to control fluctuation in curvature of field caused by zooming. The condition (6) relates to the Abbe number to the d-line of the lens element included in the second lens unit. If the condition (6) is not satisfied, it becomes difficult to control fluctuation in axial chromatic aberration caused by zooming. The condition (7) relates to anomalous dispersion according to the Abbe number of the lens element included in the second lens unit. If the condition (7) is not satisfied, it becomes difficult to control balance between a secondary spectrum and monochromatic aberration, which are generated at a telephoto limit.

When the lens element included in the second lens unit further satisfies the following condition (7)' in addition to the conditions (5) and (6), the above-mentioned effect is achieved more successfully.

$$0.005 < PgF + 0.002 \times vd - 0.664 \quad (7)'$$

In a zoom lens system having the basic configuration like the zoom lens systems according to Embodiments 1 to 9, it is preferable that the third lens unit is composed of a lens element that satisfies the following conditions (8), (9) and (10).

$$nd \leq 1.67 \quad (8)$$

$$vd < 59 \quad (9)$$

$$0.000 < PgF + 0.002 \times vd - 0.664 \quad (10)$$

where
nd is a refractive index to the d-line of the lens element,
vd is an Abbe number to the d-line of the lens element, and
PgF is a partial dispersion ratio of the lens element, which is the ratio of a difference between a refractive index to the g-line and a refractive index to the F-line, to a difference between a refractive index to the F-line and a refractive index to the C-line.

The condition (8) relates to the refractive index to the d-line of the lens element constituting the third lens unit. If the condition (8) is not satisfied, it becomes difficult to control fluctuation in curvature of field caused by zooming. The condition (9) relates to the Abbe number to the d-line of the lens element constituting the third lens unit. If the condition (9) is not satisfied, it becomes difficult to control fluctuation in axial chromatic aberration caused by zooming. The condition (10) relates to anomalous dispersion according to the Abbe number of the lens element constituting the third lens unit. If the condition (10) is not satisfied, it becomes difficult to control balance between a secondary spectrum and monochromatic aberration, which are generated at a telephoto limit.

When the lens element constituting the third lens unit further satisfies the following condition (10)' in addition to the conditions (8) and (9), the above-mentioned effect is achieved more successfully.

$$0.005 < PgF + 0.002 \times vd - 0.664 \tag{10}'$$

In a zoom lens system having the basic configuration like the zoom lens systems according to Embodiments 1 to 9, it is preferable that the first lens element located on the object side in the first lens unit satisfies the following condition (11).

$$nd_{L1} < 1.80 \tag{11}$$

where $nd_{L1}$ is a refractive index to the d-line of the first lens element.

The condition (11) relates to the refractive index to the d-line of the first lens element. If the condition (11) is not satisfied, it becomes difficult to control fluctuation in curvature of field caused by zooming.

In a zoom lens system having the basic configuration like the zoom lens systems according to Embodiments 1 to 9, it is preferable that a second lens element located on the image side in the first lens unit satisfies the following condition (12).

$$nd_{L2} < 1.80 \tag{12}$$

where $nd_{L2}$ is a refractive index to the d-line of the second lens element.

The condition (12) relates to the refractive index to the d-line of the second lens element. If the condition (12) is not satisfied, it becomes difficult to control fluctuation in curvature of field caused by zooming.

When the second lens element further satisfies the following condition (12)', the above-mentioned effect is achieved more successfully.

$$nd_{L2} < 1.70 \tag{12}'$$

In a zoom lens system having the basic configuration like the zoom lens systems according to Embodiments 1 to 9, it is preferable that the following condition (13) is satisfied.

$$D_{G1}/f_T < 0.193 \tag{13}$$

where $D_{G1}$ is an optical axial thickness of the first lens unit, and
$f_T$ is a focal length of the entire system at a telephoto limit.

The condition (13) sets forth the ratio between the optical axial thickness of the first lens unit and the focal length of the entire system at a telephoto limit. If the condition (13) is not satisfied, the optical axial thickness of the first lens unit increases, resulting in an increase in the overall length of lens system. As a result, it becomes difficult to provide compact lens barrels, imaging devices, and cameras.

In a zoom lens system having the basic configuration like the zoom lens systems according to Embodiments 1 to 9, it is preferable that the following condition (14) is satisfied.

$$f_{G2}/f_T < 0.5 \tag{14}$$

where $f_{G2}$ is a focal length of the second lens unit, and
$f_T$ is a focal length of the entire system at a telephoto limit.

The condition (14) sets forth the ratio between the focal length of the second lens unit and the focal length of the entire system at a telephoto limit. If the condition (14) is not satisfied, the focal length of the second lens unit increases, and the amount of movement of the second lens unit increases, resulting in an increase in the overall length of lens system. As a result, it becomes difficult to provide compact lens barrels, imaging devices, and cameras.

In a zoom lens system having the basic configuration like the zoom lens systems according to Embodiments 1 to 9, it is preferable that the following condition (15) is satisfied.

$$nd_{AVE} < 1.70 \tag{15}$$

where $nd_{AVE}$ is an average of refractive indices to the d-line of the lens elements having optical power in the entire system.

The condition (15) relates to the average of refractive indices to the d-line of the lens elements having optical power in the entire system. If the condition (15) is not satisfied, it becomes difficult to control fluctuation in curvature of field caused by zooming.

In a zoom lens system having the basic configuration like the zoom lens systems according to Embodiments 1 to 9, it is preferable that the following condition (16) is satisfied.

$$nd_{1AVE} < 1.70 \tag{16}$$

where $nd_{1AVE}$ is an average of refractive indices to the d-line of the lens elements constituting the first lens unit.

The condition (16) relates to the average of refractive indices to the d-line of the lens elements constituting the first lens unit. If the condition (16) is not satisfied, it becomes difficult to control fluctuation in curvature of field caused by zooming.

In a zoom lens system having the basic configuration like the zoom lens systems according to Embodiments 1 to 9, it is preferable that the following condition (17) is satisfied.

$$L_W/L_T < 1.0 \tag{17}$$

where $L_W$ is an overall length of lens system at a wide-angle limit, and
$L_T$ is an overall length of lens system at a telephoto limit.

The condition (17) sets forth the ratio between the overall length of lens system at a wide-angle limit (the distance from the object side surface of the first lens element located on the object side in the first lens unit to the image surface, at a wide-angle limit) and the overall length of lens system at a telephoto limit (the distance from the object side surface of the first lens element located on the object side in the first lens unit to the image surface, at a telephoto limit). If the condition (17) is not satisfied, the focal length of the second lens unit is reduced, which makes it difficult to compensate curvature of field caused by zooming.

Each of the lens units constituting the zoom lens system according to each embodiment is composed exclusively of refractive type lens elements that deflect the incident light by refraction (that is, lens elements of a type in which deflection is achieved at the interface between media each having a distinct refractive index). However, the present invention is not limited to this. For example, the lens units may employ diffractive type lens elements that deflect the incident light by diffraction; refractive-diffractive hybrid type lens elements that deflect the incident light by a combination of diffraction and refraction; or gradient index type lens elements that deflect the incident light by distribution of refractive index in the medium. In particular, in refractive-diffractive hybrid type lens elements, when a diffraction structure is formed in the interface between media having mutually different refractive indices, wavelength dependence in the diffraction efficiency is improved. Thus, such a configuration is preferable.

Moreover, in each embodiment, a configuration has been described that on the object side relative to the image surface S (that is, between the image surface S and the most image side lens surface in the third lens unit G3), a plane parallel plate P equivalent to such as an optical low-pass filter and a face plate of an image sensor is provided. This low-pass filter may be: a birefringent type low-pass filter made of, for example, a crystal whose predetermined crystal orientation is adjusted; or a phase type low-pass filter that achieves required characteristics of optical cut-off frequency by diffraction.

Embodiment 10

Figure 28:
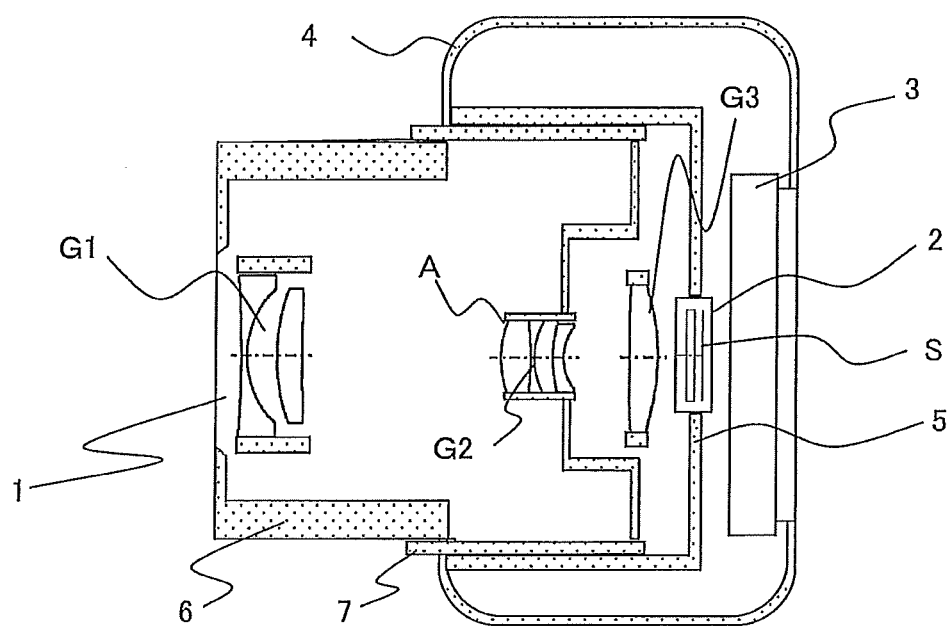
FIG. 28 is a schematic construction diagram of a digital still camera according to Embodiment 10.

FIG. 28 is a schematic construction diagram of a digital still camera according to Embodiment 10. In FIG. 28, the digital still camera comprises: an imaging device having a zoom lens system 1 and an image sensor 2 composed of a CCD; a liquid crystal display monitor 3; and a body 4. The employed zoom lens system 1 is a zoom lens system according to Embodiment 1. In FIG. 28, the zoom lens system 1, in order from the object side to the image side, comprises a first lens unit G1, an aperture diaphragm A, a second lens unit G2, and a third lens unit G3. In the body 4, the zoom lens system 1 is arranged on the front side, while the image sensor 2 is arranged on the rear side of the zoom lens system 1. On the rear side of the body 4, the liquid crystal display monitor 3 is arranged, while an optical image of a photographic object generated by the zoom lens system 1 is formed on an image surface S.

The lens barrel comprises a main barrel 5, a moving barrel 6 and a cylindrical cam 7. When the cylindrical cam 7 is rotated, the first lens unit G1, the aperture diaphragm A and the second lens unit G2, and the third lens unit G3 move to predetermined positions relative to the image sensor 2, so that zooming from a wide-angle limit to a telephoto limit is achieved. The third lens unit G3 is movable in an optical axis direction by a motor for focus adjustment.

As such, when the zoom lens system according to Embodiment 1 is employed in a digital still camera, a small digital still camera is obtained that has a high resolution and high capability of compensating the curvature of field and that has a short overall length of lens system at the time of non-use. Here, in the digital still camera shown in FIG. 28, any one of the zoom lens systems according to Embodiments 2 to 9 may be employed in place of the zoom lens system according to Embodiment 1. Further, the optical system of the digital still camera shown in FIG. 28 is applicable also to a digital video camera for moving images. In this case, moving images with high resolution can be acquired in addition to still images.

Here, the digital still camera according to the present Embodiment 10 has been described for a case that the employed zoom lens system 1 is a zoom lens system according to Embodiments 1 to 9. However, in these zoom lens systems, the entire zooming range need not be used. That is, in accordance with a desired zooming range, a range where satisfactory optical performance is obtained may exclusively be used. Then, the zoom lens system may be used as one having a lower magnification than the zoom lens system described in Embodiments 1 to 9.

Further, Embodiment 10 has been described for a case that the zoom lens system is applied to a lens barrel of so-called barrel retraction construction. However, the present invention is not limited to this. For example, the zoom lens system may be applied to a lens barrel of so-called bending configuration where a prism having an internal reflective surface or a front surface reflective mirror is arranged at an arbitrary position within the first lens unit G1 or the like. Further, in Embodiment 10, the zoom lens system may be applied to a so-called sliding lens barrel in which a part of the lens units constituting the zoom lens system like the entirety of the second lens unit G2, the entirety of the third lens unit G3, or alternatively a part of the second lens unit G2 or the third lens unit G3 is caused to escape from the optical axis at the time of barrel retraction.

An imaging device comprising a zoom lens system according to Embodiments 1 to 9, and an image sensor such as a CCD or a CMOS may be applied to a mobile terminal device such as a smart-phone, a surveillance camera in a surveillance system, a Web camera, a vehicle-mounted camera or the like.

The following description is given for numerical examples in which the zoom lens system according to Embodiments 1 to 9 are implemented practically. In the numerical examples, the units of the length in the tables are all "mm", while the units of the view angle are all "°". Moreover, in the numerical examples, r is the radius of curvature, d is the axial distance, nd is the refractive index to the d-line, vd is the Abbe number to the d-line, and PgF is the partial dispersion ratio which is the ratio of a difference between a refractive index to the g-line and a refractive index to the F-line, to a difference between a refractive index to the F-line and a refractive index to the C-line. In the numerical examples, the surfaces marked with * are aspheric surfaces, and the aspheric surface configuration is defined by the following expression.

$$Z = \frac{h^2/r}{1 + \sqrt{1-(1+\kappa)(h/r)^2}} + \sum A_n h^n$$

Here, the symbols in the formula indicate the following quantities.

Z is a distance from a point on an aspherical surface at a height h relative to the optical axis to a tangential plane at the vertex of the aspherical surface, h is a height relative to the optical axis, r is a radius of curvature at the top, κ is a conic constant, and $A_n$ is a n-th order aspherical coefficient.

FIGS. 2, 5, 8, 11, 14, 17, 20, 23, and 26 are longitudinal aberration diagrams of the zoom lens systems according to Embodiments 1 to 9, respectively.

In each longitudinal aberration diagram, part (a) shows the aberration at a wide-angle limit, part (b) shows the aberration at a middle position, and part (c) shows the aberration at a telephoto limit. Each longitudinal aberration diagram, in order from the left-hand side, shows the spherical aberration (SA (mm)), the astigmatism (AST (mm)) and the distortion (DIS (%)). In each spherical aberration diagram, the vertical axis indicates the F-number (in each Fig., indicated as F), and the solid line, the short dash line, the long dash line and the one-dot dash line indicate the characteristics to the d-line, the F-line, the C-line and the g-line, respectively. In each astigmatism diagram, the vertical axis indicates the image height (in each Fig., indicated as H), and the solid line and the dash line indicate the characteristics to the sagittal plane (in each Fig., indicated as "s") and the meridional plane (in each Fig., indicated as "m"), respectively. In each distortion diagram, the vertical axis indicates the image height (in each Fig., indicated as H).

FIGS. 3, 6, 9, 12, 15, 18, 21, 24, and 27 are lateral aberration diagrams of the zoom lens systems at a telephoto limit according to Embodiments 1 to 9, respectively.

In each lateral aberration diagram, the aberration diagrams in the upper three parts correspond to a basic state where image blur compensation is not performed at a telephoto limit, while the aberration diagrams in the lower three parts correspond to an image blur compensation state where the entirety of the second lens unit G2 is moved by a predetermined amount in a direction perpendicular to the optical axis at a telephoto limit. Among the lateral aberration diagrams of a basic state, the upper part shows the lateral aberration at an image point of 70% of the maximum image height, the middle part shows the lateral aberration at the axial image point, and the lower part shows the lateral aberration at an image point of −70% of the maximum image height. Among the lateral aberration diagrams of an image blur compensation state, the upper part shows the lateral aberration at an image point of 70% of the maximum image height, the middle part shows the lateral aberration at the axial image point, and the lower part shows the lateral aberration at an image point of −70% of the maximum image height. In each lateral aberration diagram, the horizontal axis indicates the distance from the principal ray on the pupil surface, and the solid line, the short dash line, the long dash line and the one-dot dash line indicate the characteristics to the d-line, the F-line, the C-line and the g-line, respectively. In each lateral aberration diagram, the meridional plane is adopted as the plane containing the optical axis of the first lens unit G1 and the optical axis of the second lens unit G2.

Here, in the zoom lens system according to each numerical example, the amount of movement of the second lens unit G2 in a direction perpendicular to the optical axis in an image blur compensation state at a telephoto limit is as follows.

| Numerical Example 1 | 0.041 mm |
| Numerical Example 2 | 0.043 mm |
| Numerical Example 3 | 0.041 mm |
| Numerical Example 4 | 0.041 mm |
| Numerical Example 5 | 0.045 mm |
| Numerical Example 6 | 0.044 mm |
| Numerical Example 7 | 0.041 mm |
| Numerical Example 8 | 0.043 mm |
| Numerical Example 9 | 0.042 mm |

Here, when the shooting distance is infinity, at a telephoto limit, the amount of image decentering in a case that the zoom lens system inclines by 0.3° is equal to the amount of image decentering in a case that the entirety of the second lens unit G2 displaces in parallel by each of the above-mentioned values in a direction perpendicular to the optical axis.

As seen from the lateral aberration diagrams, satisfactory symmetry is obtained in the lateral aberration at the axial image point. Further, when the lateral aberration at the +70% image point and the lateral aberration at the −70% image point are compared with each other in the basic state, all have a small degree of curvature and almost the same inclination in the aberration curve. Thus, decentering coma aberration and decentering astigmatism are small. This indicates that sufficient imaging performance is obtained even in the image blur compensation state. Further, when the image blur compensation angle of a zoom lens system is the same, the amount of parallel translation required for image blur compensation decreases with decreasing focal length of the entire zoom lens system. Thus, at arbitrary zoom positions, sufficient image blur compensation can be performed for image blur compensation angles up to 0.3° without degrading the imaging characteristics.

Numerical Example 1

The zoom lens system of Numerical Example 1 corresponds to Embodiment 1 shown in FIG. 1. Table 1 shows the surface data of the zoom lens system of Numerical Example 1. Table 2 shows the aspherical data. Table 3 shows the various data.

TABLE 1

(Surface data)

| Surface number | r | d | nd | vd | PgF |
|---|---|---|---|---|---|
| Object surface | ∞ | | | | |
| 1 | −62.86440 | 0.30000 | 1.62041 | 60.3 | |
| 2 | 4.98460 | 1.71770 | | | |
| 3* | 10.95050 | 1.40290 | 1.60690 | 27.0 | 0.6311 |
| 4* | 37.75960 | Variable | | | |
| 5(Diaphragm) | ∞ | −0.20000 | | | |
| 6 | 5.15760 | 1.68840 | 1.49700 | 81.6 | |
| 7 | −20.67870 | 0.20000 | | | |
| 8* | 3.77220 | 1.05220 | 1.52996 | 55.8 | 0.5722 |
| 9 | 7.16420 | 0.60000 | 1.60690 | 27.0 | 0.6311 |
| 10* | 2.76280 | Variable | | | |
| 11* | 130.66040 | 1.57860 | 1.52996 | 55.8 | 0.5722 |
| 12* | −11.20980 | Variable | | | |
| 13 | ∞ | 0.78000 | 1.51680 | 64.2 | |
| 14 | ∞ | (BF) | | | |
| Image surface | ∞ | | | | |

TABLE 2

(Aspherical data)

Surface No. 3

$K = 0.00000E+00$, $A4 = 1.08832E-04$, $A6 = -2.04287E-05$,
$A8 = 9.45315E-07$ $A10 = 2.92829E-08$, $A12 = 1.80889E-09$

Surface No. 4

$K = 0.00000E+00$, $A4 = -3.86726E-04$, $A6 = -4.66391E-05$,
$A8 = 2.73304E-06$ $A10 = -4.91257E-08$, $A12 = 1.43241E-09$

Surface No. 8

$K = 0.00000E+00$, $A4 = -9.68901E-04$, $A6 = -2.58799E-04$,
$A8 = 5.07983E-06$ $A10 = -9.85068E-07$, $A12 = -6.21132E-07$

Surface No. 10

$K = 0.00000E+00$, $A4 = 7.08354E-04$, $A6 = -4.50523E-04$,
$A8 = 4.09177E-05$ $A10 = -2.95424E-05$, $A12 = -9.80954E-13$

Surface No. 11

$K = 0.00000E+00$, $A4 = -2.05890E-04$, $A6 = -2.26415E-05$,
$A8 = 1.22697E-05$ $A10 = -9.09644E-07$, $A12 = 2.05933E-08$

Surface No. 12

$K = 0.00000E+00$, $A4 = 5.47111E-04$, $A6 = -1.60423E-04$,
$A8 = 2.59961E-05$ $A10 = -1.52383E-06$, $A12 = 3.06319E-08$

TABLE 3

(Various data)

Zooming ratio 3.69189

|  | Wide-angle limit | Middle position | Telephoto limit |
|---|---|---|---|
| Focal length | 5.2121 | 10.0233 | 19.2423 |
| F-number | 3.10079 | 4.40642 | 6.76520 |
| View angle | 37.3626 | 21.5327 | 11.4907 |
| Image height | 3.4850 | 3.9020 | 3.9020 |
| Overall length of lens system | 28.0673 | 26.0330 | 31.0790 |
| BF | 0.44740 | 0.44840 | 0.45913 |
| d4 | 11.2628 | 4.4076 | 0.5000 |
| d10 | 3.7133 | 9.1502 | 17.9895 |
| d12 | 3.5240 | 2.9070 | 3.0106 |

Zoom lens unit data

| Lens unit | Initial surface No. | Focal length |
|---|---|---|
| 1 | 1 | −11.49762 |
| 2 | 5 | 8.84038 |
| 3 | 11 | 19.55621 |

Numerical Example 2

The zoom lens system of Numerical Example 2 corresponds to Embodiment 2 shown in FIG. 4. Table 4 shows the surface data of the zoom lens system of Numerical Example 2. Table 5 shows the aspherical data. Table 6 shows the various data.

TABLE 4

(Surface data)

| Surface number | r | d | nd | vd | PgF |
|---|---|---|---|---|---|
| Object surface | ∞ | | | | |
| 1 | −76.80400 | 0.30000 | 1.72916 | 54.7 | |
| 2 | 5.90290 | 1.75130 | | | |
| 3* | 11.00860 | 1.34870 | 1.60690 | 27.0 | 0.6311 |
| 4* | 46.49020 | Variable | | | |
| 5(Diaphragm) | ∞ | −0.20000 | | | |
| 6 | 6.16660 | 1.23540 | 1.49700 | 81.6 | |
| 7 | −16.34170 | 0.20000 | | | |
| 8* | 4.19530 | 1.15330 | 1.52996 | 55.8 | 0.5722 |
| 9 | 10.51890 | 0.48260 | | | |
| 10 | 8.98590 | 0.60000 | 1.60690 | 27.0 | 0.6311 |
| 11* | 2.84850 | Variable | | | |
| 12* | 128.55910 | 1.65900 | 1.52996 | 55.8 | 0.5722 |
| 13* | −10.75400 | Variable | | | |
| 14 | ∞ | 0.78000 | 1.51680 | 64.2 | |
| 15 | ∞ | (BF) | | | |
| Image surface | ∞ | | | | |

TABLE 5

(Aspherical data)

Surface No. 3

K = 0.00000E+00, A4 = 7.82205E−06, A6 = −4.30680E−05,
A8 = 3.44240E−06 A10 = −1.52562E−07, A12 = 5.29615E−09

Surface No. 4

K = 0.00000E+00, A4 = −2.81956E−04, A6 = −6.23817E−05,
A8 = 6.01554E−06 A10 = −3.22920E−07, A12 = 9.29765E−09

TABLE 5-continued (Aspherical data)

Surface No. 8

K = 0.00000E+00, A4 = −8.10572E−04, A6 = −1.14167E−04,
A8 = −7.69913E−06 A10 = 3.43056E−06, A12 = −6.21132E−07

Surface No. 11

K = 0.00000E+00, A4 = 3.16466E−05, A6 = −1.69018E−04,
A8 = −2.59097E−05 A10 = −9.78559E−06, A12 = −9.81571E−13

Surface No. 12

K = 0.00000E+00, A4 = 1.56782E−04, A6 = −6.22995E−05,
A8 = 1.66044E−05 A10 = −1.16489E−06, A12 = 2.54479E−08

Surface No. 13

K = 0.00000E+00, A4 = 1.11937E−03, A6 = −2.38359E−04,
A8 = 3.37368E−05 A10 = −1.92341E−06, A12 = 3.76901E−08

TABLE 6

(Various data)

Zooming ratio 3.65866

|  | Wide-angle limit | Middle position | Telephoto limit |
|---|---|---|---|
| Focal length | 5.3020 | 10.2004 | 19.3981 |
| F-number | 3.10958 | 4.39106 | 6.69321 |
| View angle | 36.8818 | 21.1163 | 11.4396 |
| Image height | 3.4850 | 3.9020 | 3.9020 |
| Overall length of lens system | 29.0366 | 26.2465 | 30.9361 |
| BF | 0.40676 | 0.37198 | 0.30618 |
| d4 | 12.3513 | 4.8337 | 0.6911 |
| d11 | 3.6513 | 8.7411 | 17.3168 |
| d13 | 3.3169 | 2.9894 | 3.3117 |

Zoom lens unit data

| Lens unit | Initial surface No. | Focal length |
|---|---|---|
| 1 | 1 | −12.19878 |
| 2 | 5 | 9.08045 |
| 3 | 12 | 18.80325 |

Numerical Example 3

The zoom lens system of Numerical Example 3 corresponds to Embodiment 3 shown in FIG. 7. Table 7 shows the surface data of the zoom lens system of Numerical Example 3. Table 8 shows the aspherical data. Table 9 shows the various data.

TABLE 7

(Surface data)

| Surface number | r | d | nd | vd | PgF |
|---|---|---|---|---|---|
| Object surface | ∞ | | | | |
| 1 | 2000.00000 | 0.30000 | 1.72916 | 54.7 | |
| 2 | 5.15210 | 1.34220 | | | |
| 3* | 8.04450 | 1.50380 | 1.60690 | 27.0 | 0.6311 |
| 4* | 21.96640 | Variable | | | |
| 5(Diaphragm) | ∞ | −0.20000 | | | |
| 6 | 4.91620 | 2.31910 | 1.88300 | 40.8 | |
| 7 | −6.91570 | 0.53910 | 1.78472 | 25.7 | |
| 8 | 6.15140 | 0.30000 | | | |
| 9* | 3.82240 | 0.80000 | 1.54310 | 56.0 | 0.5670 |
| 10* | 3.95880 | Variable | | | |

TABLE 7-continued (Surface data)

| Surface number | r | d | nd | vd | PgF |
|---|---|---|---|---|---|
| 11* | 488.63110 | 1.57550 | 1.54310 | 56.0 | 0.5670 |
| 12* | −10.52960 | Variable | | | |
| 13 | ∞ | 0.78000 | 1.51680 | 64.2 | |
| 14 | ∞ | (BF) | | | |
| Image surface | ∞ | | | | |

TABLE 8

(Aspherical data)

Surface No. 3

K = 0.00000E+00, A4 = 8.48496E−05, A6 = −1.14574E−05,
A8 = −1.84821E−06 A10 = 5.19667E−07, A12 = −6.35477E−08,
A14 = 3.64172E−09, A16 = −7.48738E−11
Surface No. 4

K = 0.00000E+00, A4 = −3.21723E−04, A6 = −4.01299E−05,
A8 = 2.07787E−06 A10 = −1.73797E−07, A12 = 6.49639E−09,
A14 = 0.00000E+00, A16 = 0.00000E+00
Surface No. 9

K = 0.00000E+00, A4 = 1.06140E−04, A6 = 3.46610E−04,
A8 = −4.41339E−04 A10 = 7.12444E−05, A12 = −6.09830E−06,
A14 = 0.00000E+00, A16 = 0.00000E+00
Surface No. 10

K = 0.00000E+00, A4 = 6.70070E−03, A6 = 4.67279E−04,
A8 = −2.98067E−04 A10 = 1.26587E−05, A12 = 0.00000E+00,
A14 = 0.00000E+00, A16 = 0.00000E+00
Surface No. 11

K = 0.00000E+00, A4 = 6.71872E−06, A6 = −3.79147E−05,
A8 = 8.40899E−06 A10 = −2.86815E−07, A12 = 2.78882E−09,
A14 = 0.00000E+00, A16 = 0.00000E+00
Surface No. 12

K = 0.00000E+00, A4 = 4.44173E−04, A6 = −6.87996E−05,
A8 = 7.72775E−06 A10 = −7.73645E−08, A12 = −3.45164E−09,
A14 = 0.00000E+00, A16 = 0.00000E+00

TABLE 9

(Various data)

Zooming ratio 3.72821

| | Wide-angle limit | Middle position | Telephoto limit |
|---|---|---|---|
| Focal length | 5.2000 | 10.0667 | 19.3865 |
| F-number | 3.16200 | 4.50406 | 6.82842 |
| View angle | 37.3921 | 21.4317 | 11.3976 |
| Image height | 3.4850 | 3.9020 | 3.9020 |
| Overall length of lens system | 28.0482 | 25.7069 | 30.2730 |
| BF | 0.42818 | 0.42324 | 0.45041 |
| d4 | 11.4974 | 4.6086 | 0.5000 |
| d10 | 3.6804 | 9.0366 | 17.1730 |
| d12 | 3.1825 | 2.3788 | 2.8899 |

Zoom lens unit data

| Lens unit | Initial surface No. | Focal length |
|---|---|---|
| 1 | 1 | −11.68049 |
| 2 | 5 | 8.61553 |
| 3 | 11 | 19.00008 |

Numerical Example 4

The zoom lens system of Numerical Example 4 corresponds to Embodiment 4 shown in FIG. 10. Table 10 shows the surface data of the zoom lens system of Numerical Example 4. Table 11 shows the aspherical data. Table 12 shows the various data.

TABLE 10

(Surface data)

| Surface number | r | d | nd | vd | PgF |
|---|---|---|---|---|---|
| Object surface | ∞ | | | | |
| 1 | 44.30370 | 0.30000 | 1.72916 | 54.7 | |
| 2 | 5.00820 | 1.63970 | | | |
| 3* | 7.82930 | 1.25350 | 1.63550 | 23.9 | 0.6316 |
| 4* | 14.21390 | Variable | | | |
| 5(Diaphragm) | ∞ | −0.20000 | | | |
| 6 | 4.46250 | 1.61490 | 1.72916 | 54.7 | |
| 7 | −6.70550 | 0.59120 | 1.62004 | 36.3 | |
| 8 | 23.45560 | 0.41720 | | | |
| 9* | 7.47050 | 0.99250 | 1.63550 | 23.9 | 0.6316 |
| 10 | 3.74750 | Variable | | | |
| 11* | 53.14850 | 1.54760 | 1.54310 | 56.0 | 0.5670 |
| 12* | −13.51210 | Variable | | | |
| 13 | ∞ | 0.78000 | 1.51680 | 64.2 | |
| 14 | ∞ | (BF) | | | |
| Image surface | ∞ | | | | |

TABLE 11

(Aspherical data)

Surface No. 3

K = 0.00000E+00, A4 = −3.89766E−04, A6 = 3.34058E−05,
A8 = −1.39655E−05 A10 = 2.10384E−06, A12 = −1.78017E−07,
A14 = 7.91973E−09, A16 = −1.39541E−10
Surface No. 4

K = 0.00000E+00, A4 = −7.36650E−04, A6 = −1.39273E−05,
A8 = −1.44311E−06 A10 = 5.25714E−08, A12 = 8.19929E−10,
A14 = 0.00000E+00, A16 = 0.00000E+00
Surface No. 9

K = 0.00000E+00, A4 = −3.91363E−03, A6 = 7.59386E−05,
A8 = −1.61445E−04 A10 = 2.43895E−05, A12 = −2.65327E−07,
A14 = 0.00000E+00, A16 = 0.00000E+00
Surface No. 11

K = 0.00000E+00, A4 = 1.92164E−04, A6 = −6.62355E−05,
A8 = 9.26450E−06 A10 = −5.49878E−07, A12 = 1.06738E−08,
A14 = 0.00000E+00, A16 = 0.00000E+00
Surface No. 12

K = 0.00000E+00, A4 = 6.70155E−04, A6 = −1.53888E−04,
A8 = 1.74044E−05 A10 = −9.08975E−07, A12 = 1.66473E−08,
A14 = 0.00000E+00, A16 = 0.00000E+00

TABLE 12

(Various data)

Zooming ratio 3.68603

| | Wide-angle limit | Middle position | Telephoto limit |
|---|---|---|---|
| Focal length | 5.2093 | 10.0672 | 19.2016 |
| F-number | 3.17326 | 4.44961 | 6.76467 |
| View angle | 37.3248 | 21.5150 | 11.5732 |
| Image height | 3.4850 | 3.9020 | 3.9020 |
| Overall length of lens system | 27.5438 | 24.8332 | 29.3552 |

TABLE 12-continued (Various data)

| | | | |
|---|---|---|---|
| BF | 0.42391 | 0.39999 | 0.32499 |
| d4 | 11.4897 | 4.3515 | 0.5000 |
| d10 | 3.7340 | 8.4185 | 16.4571 |
| d12 | 2.9596 | 2.7266 | 3.1365 |

Zoom lens unit data

| Lens unit | Initial surface No. | Focal length |
|---|---|---|
| 1 | 1 | −11.66606 |
| 2 | 5 | 8.45677 |
| 3 | 11 | 19.99991 |

Numerical Example 5

The zoom lens system of Numerical Example 5 corresponds to Embodiment 5 shown in FIG. 13. Table 13 shows the surface data of the zoom lens system of Numerical Example 5. Table 14 shows the aspherical data. Table 15 shows the various data.

TABLE 13

(Surface data)

| Surface number | r | d | nd | vd | PgF |
|---|---|---|---|---|---|
| Object surface | ∞ | | | | |
| 1 | −231.56110 | 0.30000 | 1.72916 | 54.7 | |
| 2 | 6.02710 | 1.80390 | | | |
| 3* | 11.96030 | 1.36100 | 1.60690 | 27.0 | 0.6311 |
| 4* | 49.49900 | Variable | | | |
| 5(Diaphragm) | ∞ | −0.20000 | | | |
| 6* | 6.00000 | 0.96890 | 1.52996 | 55.8 | 0.5722 |
| 7* | 56.53100 | 0.30000 | | | |
| 8 | 5.48050 | 1.10320 | 1.72916 | 54.7 | |
| 9 | −139.95380 | 0.50870 | | | |
| 10* | −25.69090 | 0.60000 | 1.60690 | 27.0 | 0.6311 |
| 11* | 4.35390 | Variable | | | |
| 12* | 42.98600 | 1.64730 | 1.52996 | 55.8 | 0.5722 |
| 13* | −14.15400 | Variable | | | |
| 14 | ∞ | 0.78000 | 1.51680 | 64.2 | |
| 15 | ∞ | (BF) | | | |
| Image surface | ∞ | | | | |

TABLE 14

(Aspherical data)

Surface No. 3

K = 0.00000E+00, A4 = −1.13001E−04, A6 = −2.06073E−05,
A8 = 2.51378E−07 A10 = 9.96856E−08, A12 = −2.13673E−09
Surface No. 4

K = 0.00000E+00, A4 = −4.17298E−04, A6 = −3.98991E−05,
A8 = 3.10530E−06 A10 = −7.21767E−08, A12 = 1.12822E−09
Surface No. 6

K = 0.00000E+00, A4 = −8.39463E−04, A6 = −2.49947E−04,
A8 = 4.03088E−05 A10 = 1.72172E−06, A12 = −8.37000E−07
Surface No. 7

K = 0.00000E+00, A4 = −8.73551E−04, A6 = −3.28184E−04,
A8 = 1.13161E−04 A10 = −1.30775E−05, A12 = 1.96000E−07
Surface No. 10

K = 0.00000E+00, A4 = 7.52171E−03, A6 = −2.00045E−03,
A8 = 4.66127E−04 A10 = −5.41597E−05, A12 = −4.70996E−13

TABLE 14-continued (Aspherical data)

Surface No. 11

K = 0.00000E+00, A4 = 1.22033E−02, A6 = −1.96008E−03,
A8 = 5.33271E−04 A10 = −7.13983E−05, A12 = −1.12001E−13
Surface No. 12

K = 0.00000E+00, A4 = −4.35499E−04, A6 = −4.70798E−05,
A8 = 1.31793E−05 A10 = −9.41384E−07, A12 = 2.09468E−08
Surface No. 13

K = 0.00000E+00, A4 = 2.65568E−04, A6 = −1.99964E−04,
A8 = 2.74468E−05 A10 = −1.52518E−06, A12 = 2.95150E−08

TABLE 15

(Various data)

Zooming ratio 3.70952

| | Wide-angle limit | Middle position | Telephoto limit |
|---|---|---|---|
| Focal length | 5.4011 | 10.4137 | 20.0353 |
| F-number | 3.14508 | 4.43124 | 6.78228 |
| View angle | 36.3075 | 20.9148 | 11.0948 |
| Image height | 3.4850 | 3.9020 | 3.9020 |
| Overall length of lens system | 30.0241 | 27.1307 | 31.9133 |
| BF | 0.39417 | 0.36037 | 0.28344 |
| d4 | 12.8451 | 4.9201 | 0.5000 |
| d11 | 3.7057 | 9.3189 | 18.5889 |
| d13 | 3.9061 | 3.3583 | 3.3680 |

Zoom lens unit data

| Lens unit | Initial surface No. | Focal length |
|---|---|---|
| 1 | 1 | −12.86748 |
| 2 | 5 | 9.61676 |
| 3 | 12 | 20.29465 |

Numerical Example 6

The zoom lens system of Numerical Example 6 corresponds to Embodiment 6 shown in FIG. 16. Table 16 shows the surface data of the zoom lens system of Numerical Example 6. Table 17 shows the aspherical data. Table 18 shows the various data.

TABLE 16

(Surface data)

| Surface number | r | d | nd | vd | PgF |
|---|---|---|---|---|---|
| Object surface | ∞ | | | | |
| 1 | 83.05690 | 0.30000 | 1.72916 | 54.7 | |
| 2 | 5.54580 | 1.85360 | | | |
| 3* | 10.20110 | 1.39640 | 1.63550 | 23.9 | 0.6316 |
| 4* | 23.70920 | Variable | | | |
| 5(Diaphragm) | ∞ | −0.20000 | | | |
| 6 | 4.75540 | 1.51080 | 1.72916 | 54.7 | |
| 7 | −6.92690 | 0.56240 | 1.62004 | 36.3 | |
| 8 | 28.51810 | 0.39590 | | | |
| 9* | 7.64550 | 1.13760 | 1.63550 | 23.9 | 0.6316 |
| 10 | 3.76860 | Variable | | | |
| 11* | 49.42610 | 1.63310 | 1.54310 | 56.0 | 0.5670 |
| 12* | −12.07280 | Variable | | | |
| 13 | ∞ | 0.78000 | 1.51680 | 64.2 | |
| 14 | ∞ | (BF) | | | |
| Image surface | ∞ | | | | |

TABLE 17

(Aspherical data)

Surface No. 3

K = 0.00000E+00, A4 = −2.03919E−04, A6 = 2.29290E−05,
A8 = −2.16799E−06 A10 = 5.29717E−08, A12 = −3.50930E−09,
A14 = 4.91636E−10, A16 = −1.40233E−11
Surface No. 4

K = 0.00000E+00, A4 = −6.68826E−04, A6 = 6.09261E−05,
A8 = −8.82203E−06 A10 = 4.78350E−07, A12 = −8.92087E−09,
A14 = 0.00000E+00, A16 = 0.00000E+00
Surface No. 9

K = 0.00000E+00, A4 = −2.92447E−03, A6 = −2.99795E−05,
A8 = −7.63346E−05 A10 = 2.54472E−05, A12 = −3.98085E−06,
A14 = 0.00000E+00, A16 = 0.00000E+00
Surface No. 11

K = 0.00000E+00, A4 = 2.86077E−04, A6 = −1.51602E−04,
A8 = 2.29024E−05 A10 = −1.37883E−06, A12 = 2.86256E−08,
A14 = 0.00000E+00, A16 = 0.00000E+00
Surface No. 12

K = 0.00000E+00, A4 = 1.29488E−03, A6 = −3.16584E−04,
A8 = 3.82581E−05 A10 = −2.02056E−06, A12 = 3.82556E−08,
A14 = 0.00000E+00, A16 = 0.00000E+00

TABLE 18

(Various data)

Zooming ratio 3.72205

| | Wide-angle limit | Middle position | Telephoto limit |
|---|---|---|---|
| Focal length | 5.0059 | 9.5987 | 18.6322 |
| F-number | 3.22310 | 4.41323 | 6.82326 |
| View angle | 38.4368 | 22.1917 | 11.6630 |
| Image height | 3.4850 | 3.9020 | 3.9020 |
| Overall length of lens system | 29.6896 | 25.7773 | 30.0261 |
| BF | 0.41980 | 0.41417 | 0.40630 |
| d4 | 13.0154 | 4.7237 | 0.5000 |
| d10 | 3.7214 | 8.0328 | 16.8399 |
| d12 | 3.1633 | 3.2368 | 2.9101 |

Zoom lens unit data

| Lens unit | Initial surface No. | Focal length |
|---|---|---|
| 1 | 1 | −12.49093 |
| 2 | 5 | 9.07493 |
| 3 | 11 | 18.03413 |

Numerical Example 7

The zoom lens system of Numerical Example 7 corresponds to Embodiment 7 shown in FIG. 19. Table 19 shows the surface data of the zoom lens system of Numerical Example 7. Table 20 shows the aspherical data. Table 21 shows the various data.

TABLE 19

(Surface data)

| Surface number | r | d | nd | vd | PgF |
|---|---|---|---|---|---|
| Object surface | ∞ | | | | |
| 1 | 46.22340 | 0.40000 | 1.72916 | 54.7 | |
| 2 | 4.99970 | 1.55300 | | | |
| 3* | 7.99860 | 1.29510 | 1.63550 | 23.9 | 0.6316 |
| 4* | 15.21490 | Variable | | | |
| 5(Diaphragm) | ∞ | −0.20000 | | | |
| 6 | 4.47880 | 1.60450 | 1.72916 | 54.7 | |
| 7 | −6.64040 | 0.61380 | 1.62004 | 36.3 | |
| 8 | 24.51940 | 0.36240 | | | |
| 9* | 7.17810 | 0.98090 | 1.63550 | 23.9 | 0.6316 |
| 10 | 3.66280 | Variable | | | |
| 11* | 44.91320 | 1.56840 | 1.54310 | 56.0 | 0.5670 |
| 12* | −14.15080 | Variable | | | |
| 13 | ∞ | 0.78000 | 1.51680 | 64.2 | |
| 14 | ∞ | (BF) | | | |
| Image surface | ∞ | | | | |

TABLE 20

(Aspherical data)

Surface No. 3

K = 0.00000E+00, A4 = −3.76884E−04, A6 = 1.84567E−05,
A8 = −1.28366E−05 A10 = 2.13253E−06, A12 = −1.75595E−07,
A14 = 7.54326E−09, A16 = −1.30608E−10
Surface No. 4

K = 0.00000E+00, A4 = −7.21627E−04, A6 = −4.18052E−05,
A8 = 2.30883E−06 A10 = −6.83542E−08, A12 = 1.30107E−09,
A14 = 0.00000E+00, A16 = 0.00000E+00
Surface No. 9

K = 0.00000E+00, A4 = −3.78053E−03, A6 = 9.23730E−05,
A8 = −1.62370E−04 A10 = 2.39315E−05, A12 = −2.65327E−07,
A14 = 0.00000E+00, A16 = 0.00000E+00
Surface No. 11

K = 0.00000E+00, A4 = −4.76246E−05, A6 = −1.04771E−04,
A8 = 1.43373E−05 A10 = −7.16892E−07, A12 = 1.20619E−08,
A14 = 0.00000E+00, A16 = 0.00000E+00
Surface No. 12

K = 0.00000E+00, A4 = 3.43749E−04, A6 = −1.90347E−04,
A8 = 2.20451E−05 A10 = −1.02586E−06, A12 = 1.66745E−08,
A14 = 0.00000E+00, A16 = 0.00000E+00

TABLE 21

(Various data)

Zooming ratio 3.68476

| | Wide-angle limit | Middle position | Telephoto limit |
|---|---|---|---|
| Focal length | 5.2112 | 10.0775 | 19.2022 |
| F-number | 3.17642 | 4.48115 | 6.76175 |
| View angle | 37.3205 | 21.4964 | 11.5655 |
| Image height | 3.4850 | 3.9020 | 3.9020 |
| Overall length of lens system | 27.5510 | 24.9675 | 29.3785 |
| BF | 0.43097 | 0.41095 | 0.32113 |
| d4 | 11.4626 | 4.4527 | 0.5000 |
| d10 | 3.7446 | 8.6675 | 16.4628 |
| d12 | 2.9547 | 2.4783 | 3.1365 |

Zoom lens unit data

| Lens unit | Initial surface No. | Focal length |
|---|---|---|
| 1 | 1 | −11.68974 |
| 2 | 5 | 8.44700 |
| 3 | 11 | 20.00001 |

Numerical Example 8

The zoom lens system of Numerical Example 8 corresponds to Embodiment 8 shown in FIG. 22. Table 22 shows the surface data of the zoom lens system of Numerical Example 8. Table 23 shows the aspherical data. Table 24 shows the various data.

TABLE 22

(Surface data)

| Surface number | r | d | nd | vd | PgF |
|---|---|---|---|---|---|
| Object surface | ∞ | | | | |
| 1 | 111.40660 | 0.10000 | 1.72916 | 54.7 | |
| 2 | 5.07720 | 1.38980 | | | |
| 3* | 7.91140 | 1.51280 | 1.60690 | 27.0 | 0.6311 |
| 4* | 19.45650 | Variable | | | |
| 5(Diaphragm) | ∞ | −0.20000 | | | |
| 6 | 4.20190 | 1.69060 | 1.72916 | 54.7 | |
| 7 | −6.25090 | 0.40000 | 1.62004 | 36.3 | |
| 8 | 15.73020 | 0.45160 | | | |
| 9* | 7.29460 | 0.80090 | 1.60690 | 27.0 | 0.6311 |
| 10 | 3.65970 | Variable | | | |
| 11* | 84.49960 | 1.54760 | 1.52996 | 55.8 | 0.5722 |
| 12* | −12.04260 | Variable | | | |
| 13 | ∞ | 0.78000 | 1.51680 | 64.2 | |
| 14 | ∞ | (BF) | | | |
| Image surface | ∞ | | | | |

TABLE 23

(Aspherical data)

Surface No. 3

K = 0.00000E+00, A4 = −1.17112E−04, A6 = 2.37957E−05,
A8 = −1.22796E−05 A10 = 2.21716E−06, A12 = −2.05357E−07,
A14 = 9.41647E−09, A16 = −1.65687E−10
Surface No. 4

K = 0.00000E+00, A4 = −5.27621E−04, A6 = −2.25926E−05,
A8 = 1.36457E−06 A10 = −1.80739E−07, A12 = 7.12765E−09,
A14 = 0.00000E+00, A16 = 0.00000E+00
Surface No. 9

K = 0.00000E+00, A4 = −4.82880E−03, A6 = 9.21570E−05,
A8 = −2.11066E−04 A10 = 3.04428E−05, A12 = −2.65326E−07,
A14 = 0.00000E+00, A16 = 0.00000E+00
Surface No. 11

K = 0.00000E+00, A4 = 4.38921E−04, A6 = −5.78879E−05,
A8 = 7.93736E−06 A10 = −3.54399E−07, A12 = 5.96978E−09,
A14 = 0.00000E+00, A16 = 0.00000E+00
Surface No. 12

K = 0.00000E+00, A4 = 9.02012E−04, A6 = −1.28252E−04,
A8 = 1.38821E−05 A10 = −5.94293E−07, A12 = 9.68741E−09,
A14 = 0.00000E+00, A16 = 0.00000E+00

TABLE 24

(Various data)

Zooming ratio 3.70602

| | Wide-angle limit | Middle position | Telephoto limit |
|---|---|---|---|
| Focal length | 5.2066 | 10.0505 | 19.2959 |
| F-number | 3.17572 | 4.48077 | 6.79518 |
| View angle | 37.3449 | 21.5506 | 11.5293 |
| Image height | 3.4850 | 3.9020 | 3.9020 |
| Overall length of lens system | 27.5417 | 24.8544 | 29.1622 |

TABLE 24-continued (Various data)

| | | | |
|---|---|---|---|
| BF | 0.42194 | 0.40201 | 0.38349 |
| d4 | 11.7411 | 4.6022 | 0.5000 |
| d10 | 3.7176 | 8.7950 | 16.7944 |
| d12 | 3.1878 | 2.5819 | 3.0110 |

Zoom lens unit data

| Lens unit | Initial surface No. | Focal length |
|---|---|---|
| 1 | 1 | −11.87821 |
| 2 | 5 | 8.61317 |
| 3 | 11 | 20.00013 |

Numerical Example 9

The zoom lens system of Numerical Example 9 corresponds to Embodiment 9 shown in FIG. 25. Table 25 shows the surface data of the zoom lens system of Numerical Example 9. Table 26 shows the aspherical data. Table 27 shows the various data.

TABLE 25

(Surface data)

| Surface number | r | d | nd | vd | PgF |
|---|---|---|---|---|---|
| Object surface | ∞ | | | | |
| 1 | 114.71610 | 0.30000 | 1.72916 | 54.7 | |
| 2 | 5.09690 | 1.37160 | | | |
| 3* | 7.31600 | 1.48110 | 1.60690 | 27.0 | 0.6311 |
| 4* | 16.08140 | Variable | | | |
| 5(Diaphragm) | ∞ | −0.20000 | | | |
| 6 | 4.19540 | 1.69050 | 1.72916 | 54.7 | |
| 7 | −5.99660 | 0.40000 | 1.62004 | 36.3 | |
| 8 | 13.59980 | 0.48970 | | | |
| 9* | 7.36090 | 0.95770 | 1.60690 | 27.0 | 0.6311 |
| 10 | 3.77450 | Variable | | | |
| 11* | 147.89880 | 1.68640 | 1.52996 | 55.8 | 0.5722 |
| 12* | −10.15670 | Variable | | | |
| 13 | ∞ | 0.78000 | 1.51680 | 64.2 | |
| 14 | ∞ | (BF) | | | |
| Image surface | ∞ | | | | |

TABLE 26

(Aspherical data)

Surface No.3

K = 0.00000E+00, A4 = −1.42338E−04, A6 = 4.38191E−05,
A8 = −9.30563E−06 A10 = 7.86242E−07, A12 = −4.15479E−08,
A14 = 8.76075E−10, A16 = 6.21410E−12
Surface No.4

K = 0.00000E+00, A4 = −4.61356E−04, A6 = 4.81903E−06,
A8 = −3.02859E−06 A10 = −3.22742E−08, A12 = 6.22407E−09,
A14 = 0.00000E+00, A16 = 0.00000E+00
Surface No.9

K = 0.00000E+00, A4 = −4.86221E−03, A6 = 7.27221E−05,
A8 = −2.92714E−04 A10 = 7.11677E−05, A12 = −6.09830E−06,
A14 = 0.00000E+00, A16 = 0.00000E+00
Surface No.11

K = 0.00000E+00, A4 = 6.20292E−05, A6 = 4.59789E−05,
A8 = −3.57498E−07 A10 = −1.90404E−07, A12 = 6.34574E−09,
A14 = 0.00000E+00, A16 = 0.00000E+00

TABLE 26-continued (Aspherical data)

Surface No.12

K = 0.00000E+00, A4 = 7.00267E−04, A6 = −3.95506E−05,
A8 = 8.15756E−06 A10 = −6.00854E−07, A12 = 1.35389E−08,
A14 = 0.00000E+00, A16 = 0.00000E+00

TABLE 27

(Various data)

Zooming ratio 3.70665

|  | Wide-angle limit | Middle position | Telephoto limit |
|---|---|---|---|
| Focal length | 5.1986 | 9.9948 | 19.2696 |
| F-number | 3.16472 | 4.41652 | 6.78785 |
| View angle | 37.4101 | 21.5821 | 11.5618 |
| Image height | 3.4850 | 3.9020 | 3.9020 |
| Overall length of lens system | 27.4934 | 24.6785 | 29.1860 |
| BF | 0.41253 | 0.39187 | 0.37334 |
| d4 | 11.5554 | 4.3796 | 0.5000 |
| d10 | 3.6829 | 8.2387 | 16.5344 |
| d12 | 2.8857 | 2.7113 | 2.8213 |

Zoom lens unit data

| Lens unit | Initial surface No. | Focal length |
|---|---|---|
| 1 | 1 | −11.87111 |
| 2 | 5 | 8.47710 |
| 3 | 11 | 18.00000 |

The following Table 28 shows the corresponding values to the individual conditions in the zoom lens systems of each of Numerical Examples.

The zoom lens system according to the present invention is applicable to a digital input device, such as a digital camera, a mobile terminal device such as a smart-phone, a surveillance camera in a surveillance system, a Web camera or a vehicle-mounted camera. In particular, the zoom lens system according to the present invention is suitable for a photographing optical system where high image quality is required like in a digital camera.

Although the present invention has been fully described by way of example with reference to the accompanying drawings, it is to be understood that various changes and modifications will be apparent to those skilled in the art. Therefore, unless otherwise such changes and modification depart from the scope of the present invention, they should be construed as being included therein.

What is claimed is:

1. A zoom lens system having a plurality of lens units, each lens unit being composed of at least one lens element, the zoom lens system, in order from an object side to an image side, comprising:
a first lens unit having negative optical power;
a second lens unit having positive optical power; and
a third lens unit having positive optical power, wherein
in zooming from a wide-angle limit to a telephoto limit at a time of image taking, the first lens unit, the second lens unit, and the third lens unit are individually moved along an optical axis to vary magnification,
the first lens unit is composed of two lens elements,
the third lens unit is composed of one lens element,
the first lens unit includes a lens element having at least one aspheric surface and positive optical power, and
the following condition (1) is satisfied:

$$1.74 < Ir/\sqrt{(|D_{L1} \times f_{G1}|)} \tag{1}$$

where
$D_{L1}$ is an optical axial thickness of a first lens element located on the object side in the first lens unit,
$f_{G1}$ is a focal length of the first lens unit,
Ir is a maximum image height (Ir=$f_T \times \tan(\omega_T)$),

TABLE 28

(Values corresponding to conditions)

Numerical Example

| Condition | | 1 | 2 | 3 | 4 | 5 | 6 | 7 | 8 | 9 |
|---|---|---|---|---|---|---|---|---|---|---|
| (1) | | 2.11 | 2.05 | 2.09 | 2.10 | 2.00 | 1.99 | 1.82 | 3.61 | 2.09 |
| (2) | L2 | 1.60690 | 1.60690 | 1.60690 | 1.63550 | 1.60690 | 1.63550 | 1.63550 | 1.60690 | 1.60690 |
| (3) | L2 | 27.0 | 27.0 | 27.0 | 23.9 | 27.0 | 23.9 | 23.9 | 27.0 | 27.0 |
| (4) | L2 | 0.021 | 0.021 | 0.021 | 0.015 | 0.021 | 0.015 | 0.015 | 0.021 | 0.021 |
| (5) | L3 | — | — | — | — | 1.52996 | — | — | — | — |
|  | L4 | 1.52996 | 1.52996 | — | — | — | — | — | — | — |
|  | L5 | 1.60690 | 1.60690 | 1.54310 | 1.63550 | 1.60690 | 1.63550 | 1.63550 | 1.60690 | 1.60690 |
| (6) | L3 | — | — | — | — | 55.8 | — | — | — | — |
|  | L4 | 55.8 | 55.8 | — | — | — | — | — | — | — |
|  | L5 | 27.0 | 27.0 | 56.0 | 23.9 | 27.0 | 23.9 | 23.9 | 27.0 | 27.0 |
| (7) | L3 | — | — | — | — | 0.020 | — | — | — | — |
|  | L4 | 0.020 | 0.020 | — | — | — | — | — | — | — |
|  | L5 | 0.021 | 0.021 | 0.015 | 0.015 | 0.021 | 0.015 | 0.015 | 0.021 | 0.021 |
| (8) | L6 | 1.52996 | 1.52996 | 1.54310 | 1.54310 | 1.52996 | 1.54310 | 1.54310 | 1.52996 | 1.52996 |
| (9) | L6 | 55.8 | 55.8 | 56.0 | 56.0 | 55.8 | 56.0 | 56.0 | 55.8 | 55.8 |
| (10) | L6 | 0.020 | 0.020 | 0.015 | 0.015 | 0.020 | 0.015 | 0.015 | 0.020 | 0.020 |
| (11) | | 1.62 | 1.73 | 1.73 | 1.73 | 1.73 | 1.73 | 1.73 | 1.73 | 1.73 |
| (12) | | 1.61 | 1.61 | 1.61 | 1.64 | 1.61 | 1.64 | 1.64 | 1.61 | 1.61 |
| (13) | | 0.18 | 0.18 | 0.16 | 0.17 | 0.17 | 0.19 | 0.17 | 0.16 | 0.16 |
| (14) | | 0.46 | 0.47 | 0.44 | 0.44 | 0.48 | 0.49 | 0.44 | 0.45 | 0.44 |
| (15) | | 1.57 | 1.58 | 1.68 | 1.65 | 1.62 | 1.65 | 1.65 | 1.64 | 1.64 |
| (16) | | 1.61 | 1.67 | 1.67 | 1.68 | 1.67 | 1.68 | 1.68 | 1.67 | 1.67 |
| (17) | | 0.90 | 0.94 | 0.93 | 0.94 | 0.94 | 0.99 | 0.93 | 0.94 | 0.94 |

$f_T$ is a focal length of the entire zoom lens system at a telephoto limit, and $\omega_T$ is a half value (°) of maximum view angle at a telephoto limit.

2. The zoom lens system as claimed in claim 1, wherein the second lens unit is composed of three lens elements each having optical power.

3. The zoom lens system as claimed in claim 1, wherein the first lens unit includes at least one lens element that satisfies the following conditions (2), (3) and (4):

$$nd \leq 1.67 \tag{2}$$

$$vd < 59 \tag{3}$$

$$0.000 < PgF + 0.002 \times vd - 0.664 \tag{4}$$

where nd is a refractive index to the d-line of the lens element, vd is an Abbe number to the d-line of the lens element, and PgF is a partial dispersion ratio of the lens element, which is the ratio of a difference between a refractive index to the g-line and a refractive index to the F-line, to a difference between a refractive index to the F-line and a refractive index to the C-line.

4. The zoom lens system as claimed in claim 1, wherein the second lens unit includes at least one lens element that satisfies the following conditions (5), (6) and (7):

$$nd \leq 1.67 \tag{5}$$

$$vd < 59 \tag{6}$$

$$0.000 < PgF + 0.002 \times vd - 0.664 \tag{7}$$

where nd is a refractive index to the d-line of the lens element, vd is an Abbe number to the d-line of the lens element, and PgF is a partial dispersion ratio of the lens element, which is the ratio of a difference between a refractive index to the g-line and a refractive index to the F-line, to a difference between a refractive index to the F-line and a refractive index to the C-line.

5. The zoom lens system as claimed in claim 1, wherein the third lens unit is composed of a lens element that satisfies the following conditions (8), (9) and (10):

$$nd \leq 1.67 \tag{8}$$

$$vd < 59 \tag{9}$$

$$0.000 < PgF + 0.002 \times vd - 0.664 \tag{10}$$

where nd is a refractive index to the d-line of the lens element, vd is an Abbe number to the d-line of the lens element, and PgF is a partial dispersion ratio of the lens element, which is the ratio of a difference between a refractive index to the g-line and a refractive index to the F-line, to a difference between a refractive index to the F-line and a refractive index to the C-line.

6. The zoom lens system as claimed in claim 1, wherein the first lens element located on the object side in the first lens unit satisfies the following condition (11):

$$nd_{L1} < 1.80 \tag{11}$$

where $nd_{L1}$ is a refractive index to the d-line of the first lens element.

7. The zoom lens system as claimed in claim 1, wherein a second lens element located on the image side in the first lens unit satisfies the following condition (12):

$$nd_{L2} < 1.80 \tag{12}$$

where $nd_{L2}$ is a refractive index to the d-line of the second lens element.

8. The zoom lens system as claimed in claim 1, wherein the following condition (13) is satisfied:

$$D_{G1}/f_T < 0.193 \tag{13}$$

where $D_{G1}$ is an optical axial thickness of the first lens unit.

9. The zoom lens system as claimed in claim 1, wherein the following condition (14) is satisfied:

$$f_{G2}/f_T < 0.5 \tag{14}$$

where $f_{G2}$ is a focal length of the second lens unit.

10. The zoom lens system as claimed in claim 1, wherein the following condition (15) is satisfied:

$$nd_{AVE} < 1.70 \tag{15}$$

where $nd_{AVE}$ is an average of refractive indices to the d-line of the lens elements each having optical power in the entire system.

11. The zoom lens system as claimed in claim 1, wherein the following condition (16) is satisfied:

$$nd_{1AVE} < 1.70 \tag{16}$$

where $nd_{1AVE}$ is an average of refractive indices to the d-line of the lens elements constituting the first lens unit.

12. The zoom lens system as claimed in claim 1, wherein the following condition (17) is satisfied:

$$L_W/L_T < 1.0 \tag{17}$$

where $L_W$ is an overall length of lens system at a wide-angle limit, and $L_T$ is an overall length of lens system at a telephoto limit.

13. The zoom lens system as claimed in claim 1, wherein the second lens unit moves in a direction perpendicular to the optical axis to optically compensate image blur.

14. An imaging device capable of outputting an optical image of an object as an electric image signal, comprising:

a zoom lens system that forms an optical image of the object; and an image sensor that converts the optical image formed by the zoom lens system into the electric image signal, wherein the zoom lens system is a zoom lens system as claimed in claim 1.

15. A camera for converting an optical image of an object into an electric image signal and then performing at least one of displaying and storing of the converted image signal, comprising:

an imaging device including a zoom lens system that forms an optical image of the object, and an image sensor that converts the optical image formed by the zoom lens system into the electric image signal, wherein the zoom lens system is a zoom lens system as claimed in claim 1.

* * * * *